Figure 15:
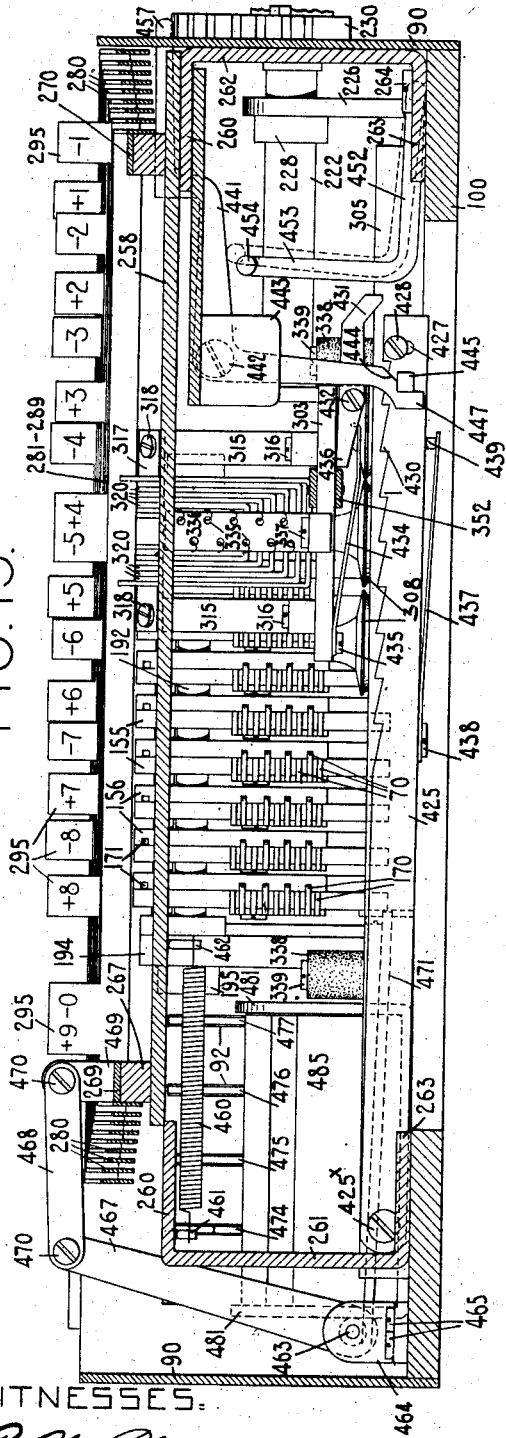

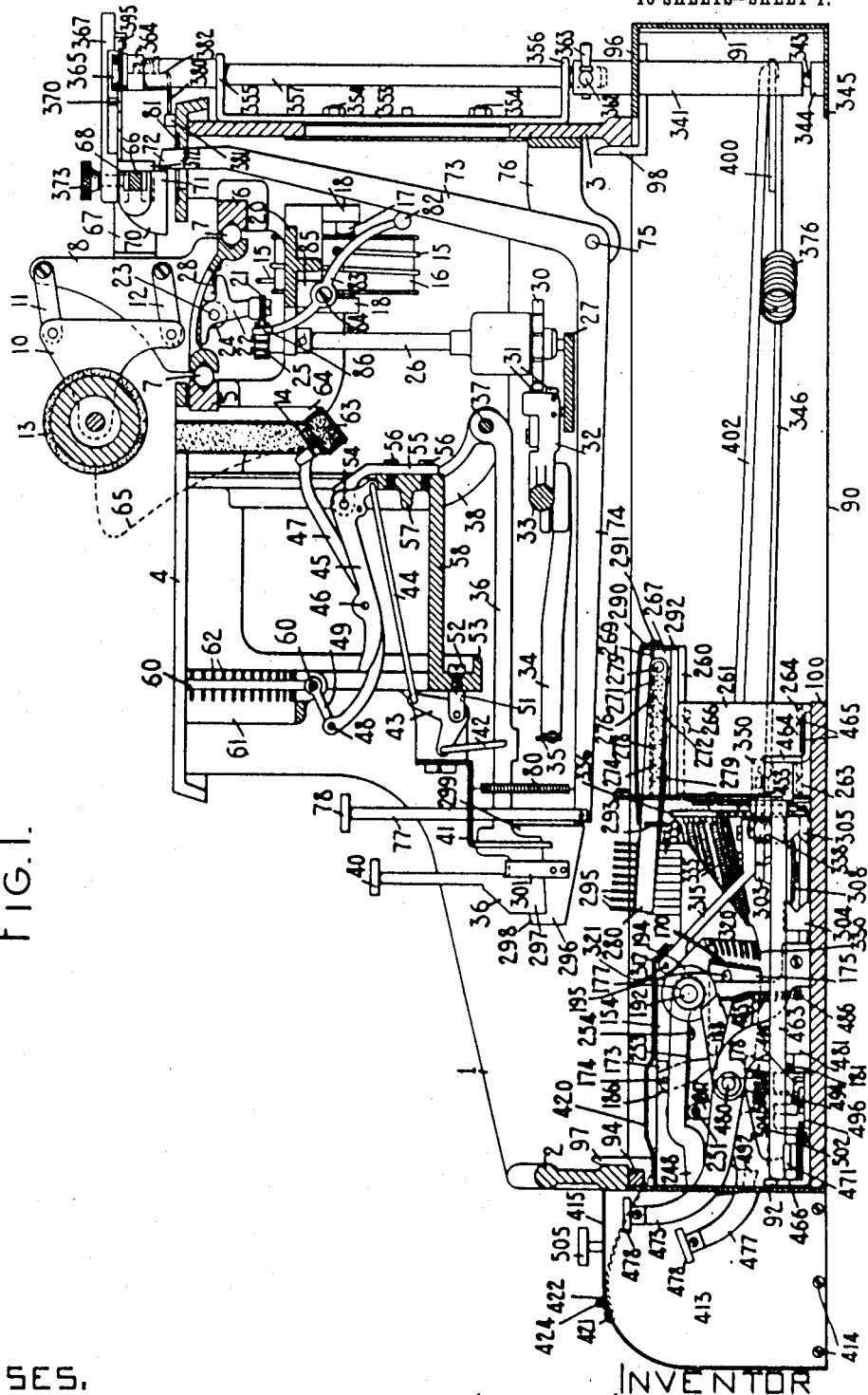

A. W. SMITH.
COMBINED TYPE WRITING AND COMPUTING MACHINE.
APPLICATION FILED OCT. 29, 1909.

1,036,921.

Patented Aug. 27, 1912.

10 SHEETS—SHEET 2.

WITNESSES:
E. M. Wells
R. H. Strother

INVENTOR:
Arthur W. Smith
By Jacob Felbel
HIS ATTORNEY

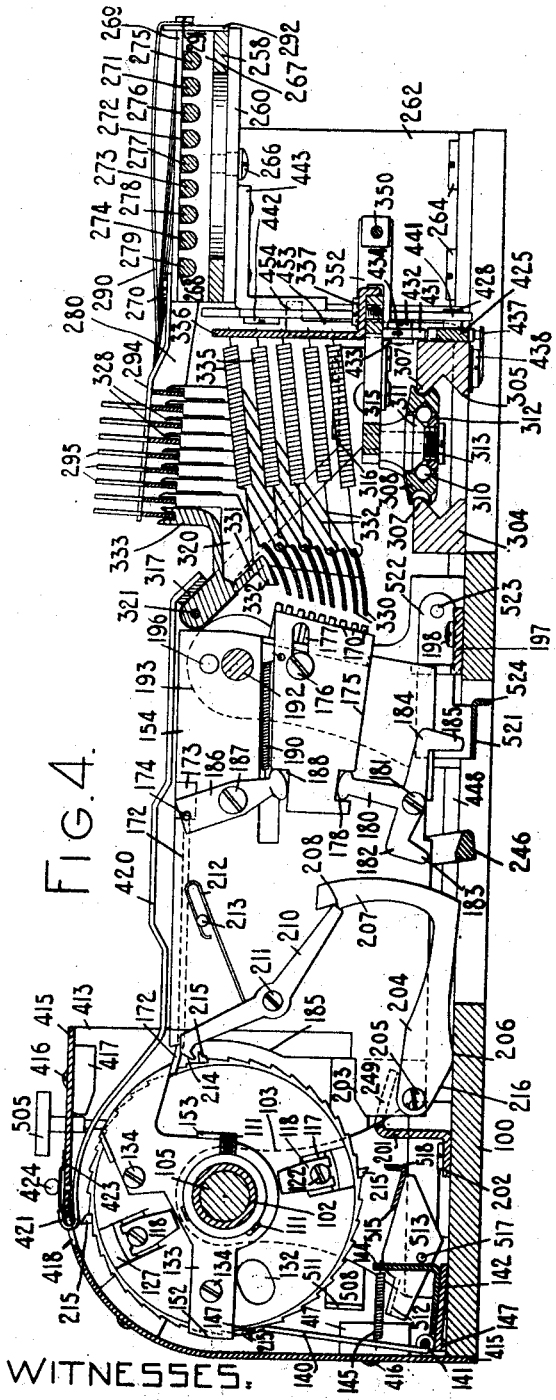
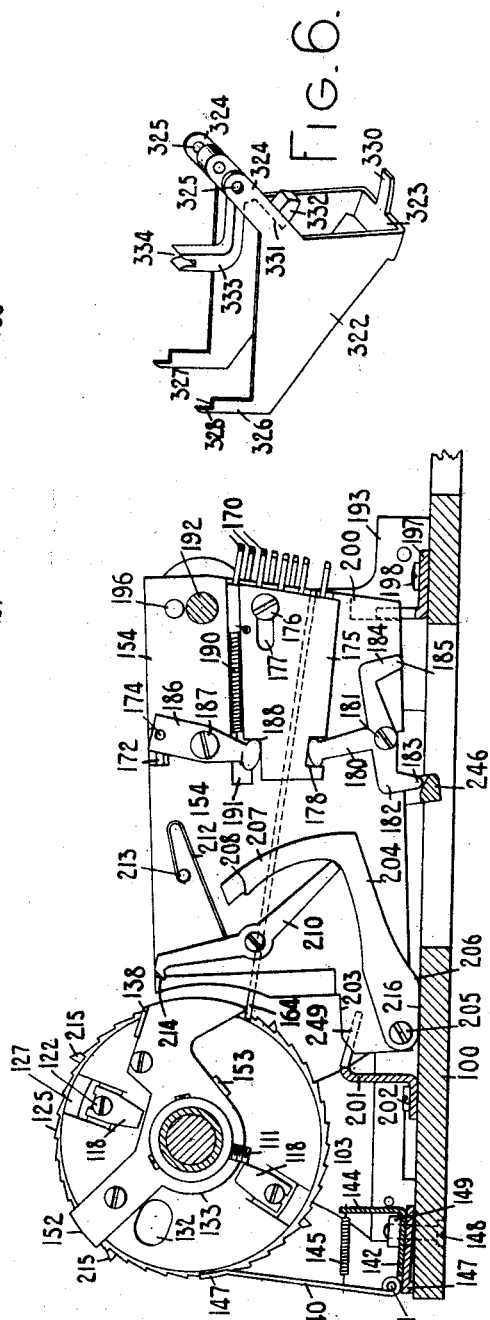

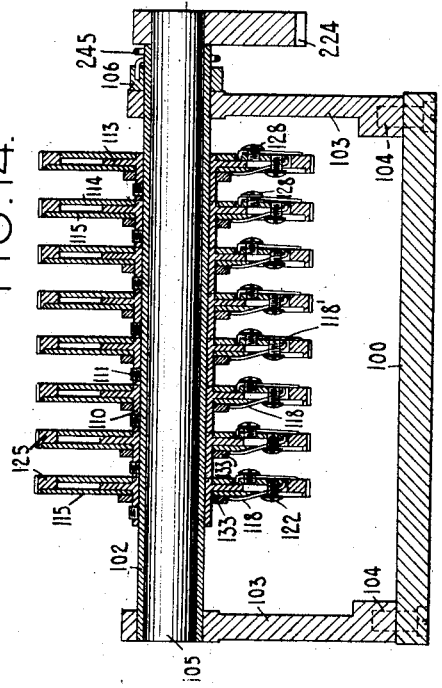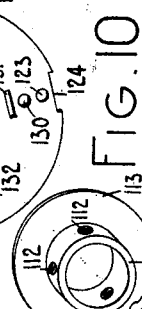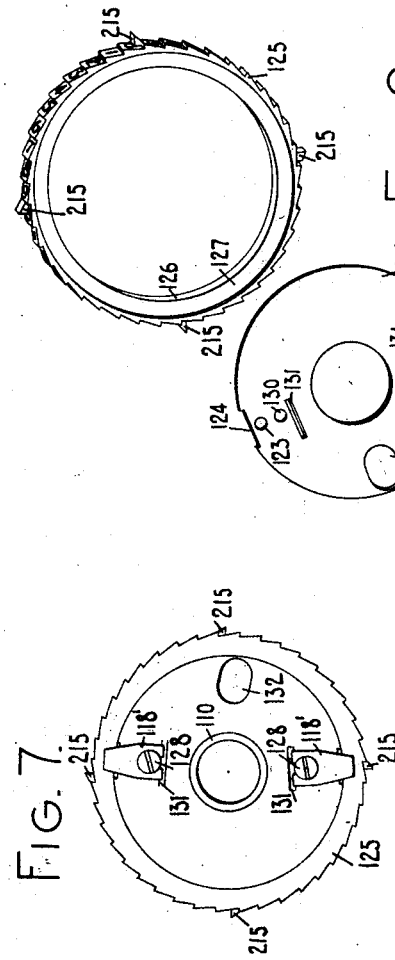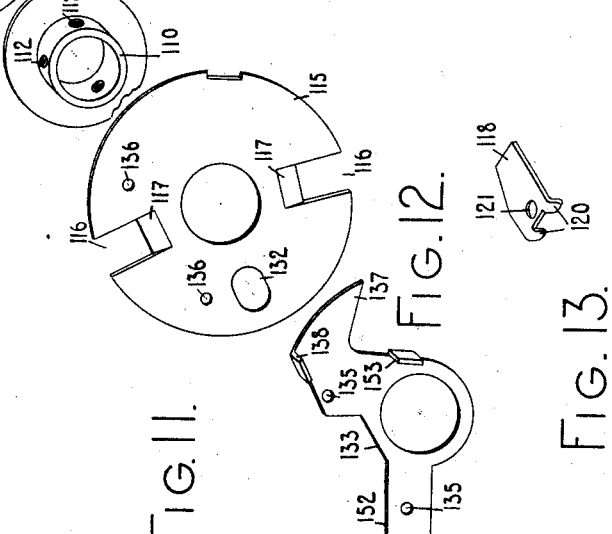

A. W. SMITH.
COMBINED TYPE WRITING AND COMPUTING MACHINE.
APPLICATION FILED OCT. 29, 1909.

1,036,921.

Patented Aug. 27, 1912.

10 SHEETS—SHEET 5.

WITNESSES.
E. M. Wells.
R. H. Strother.

INVENTOR.
Arthur W. Smith
By Jacob Felbel
HIS ATTORNEY

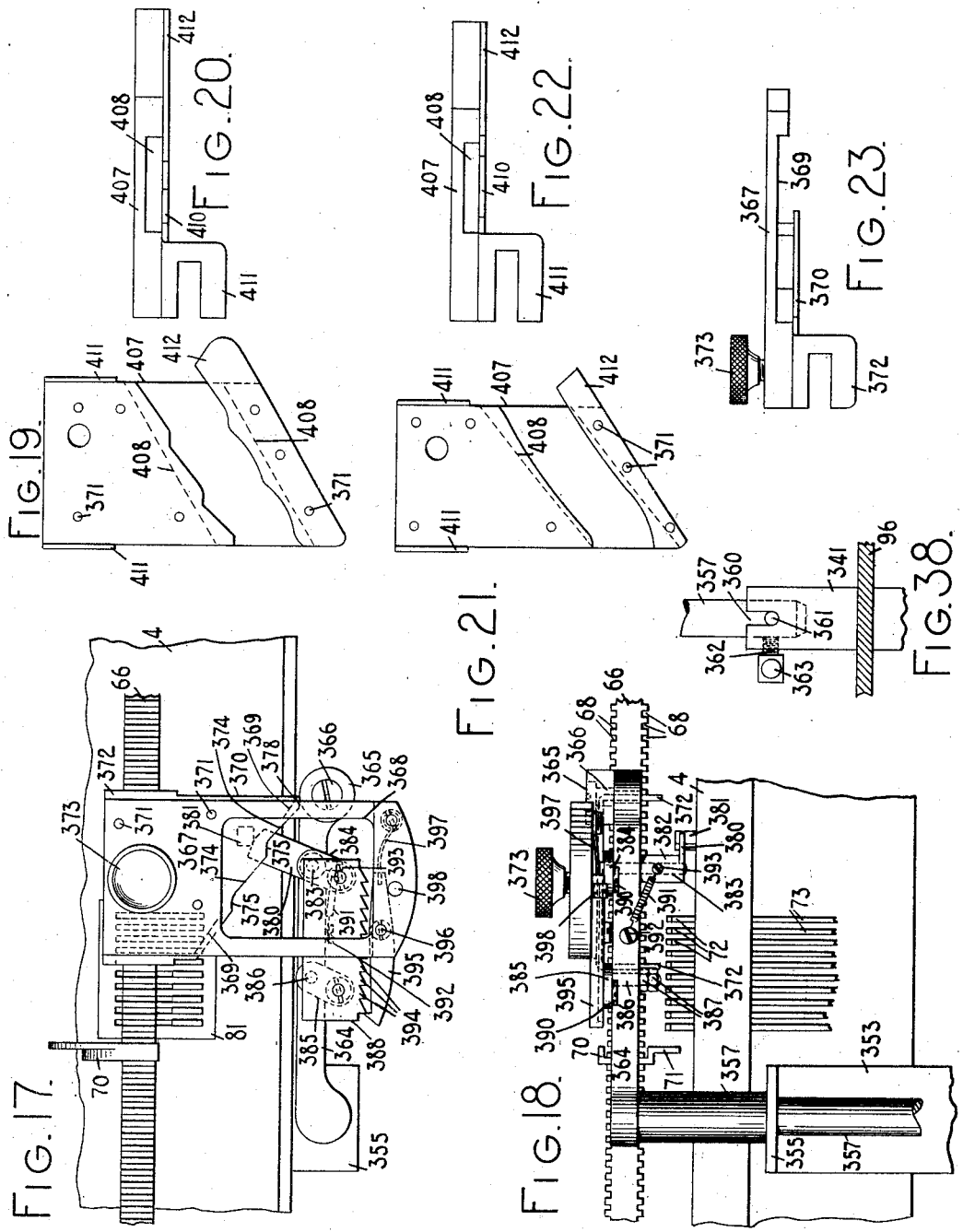

A. W. SMITH.
COMBINED TYPE WRITING AND COMPUTING MACHINE.
APPLICATION FILED OCT. 29, 1909.
1,036,921.
Patented Aug. 27, 1912.
10 SHEETS—SHEET 7.
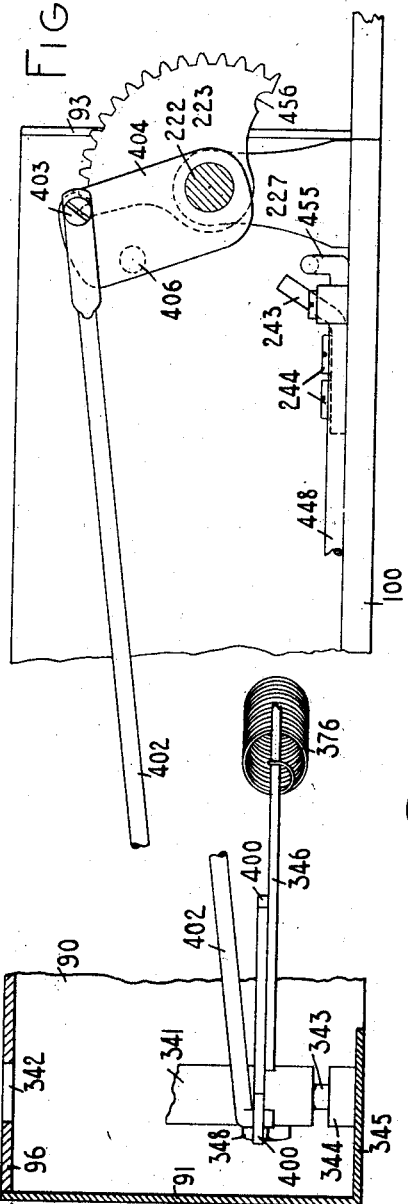
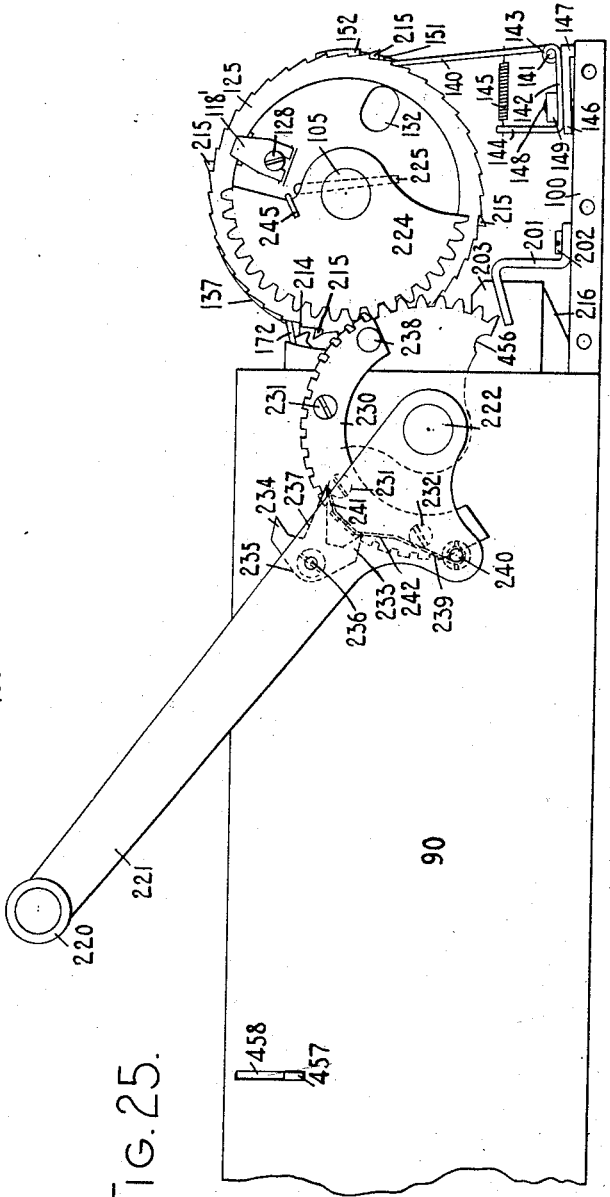
WITNESSES:
E. M. Wells.
R. H. Strother.
INVENTOR:
Arthur W. Smith
By Jacob Felbel
HIS ATTORNEY

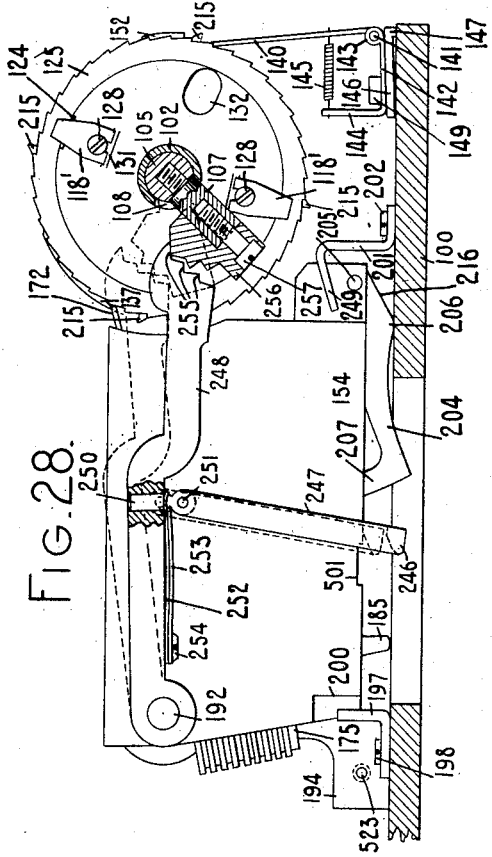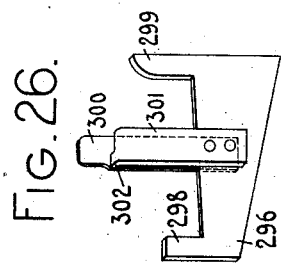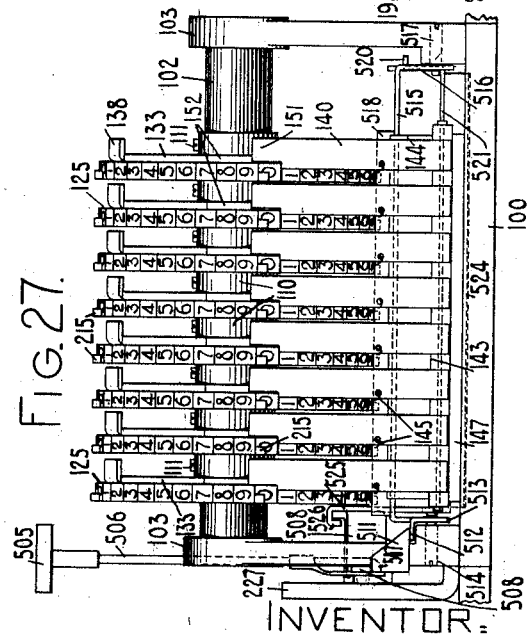

A. W. SMITH.
COMBINED TYPE WRITING AND COMPUTING MACHINE.
APPLICATION FILED OCT. 29, 1909.
1,036,921.
Patented Aug. 27, 1912.
10 SHEETS—SHEET 9.
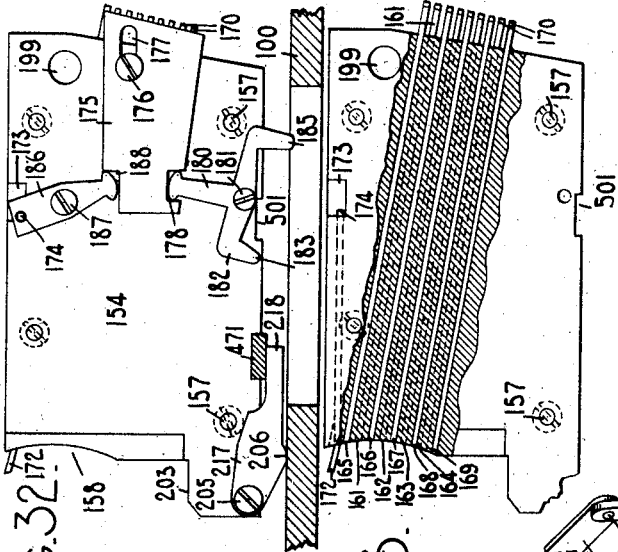
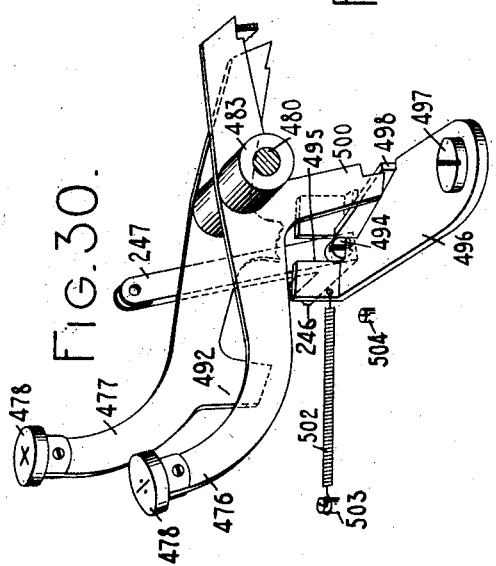
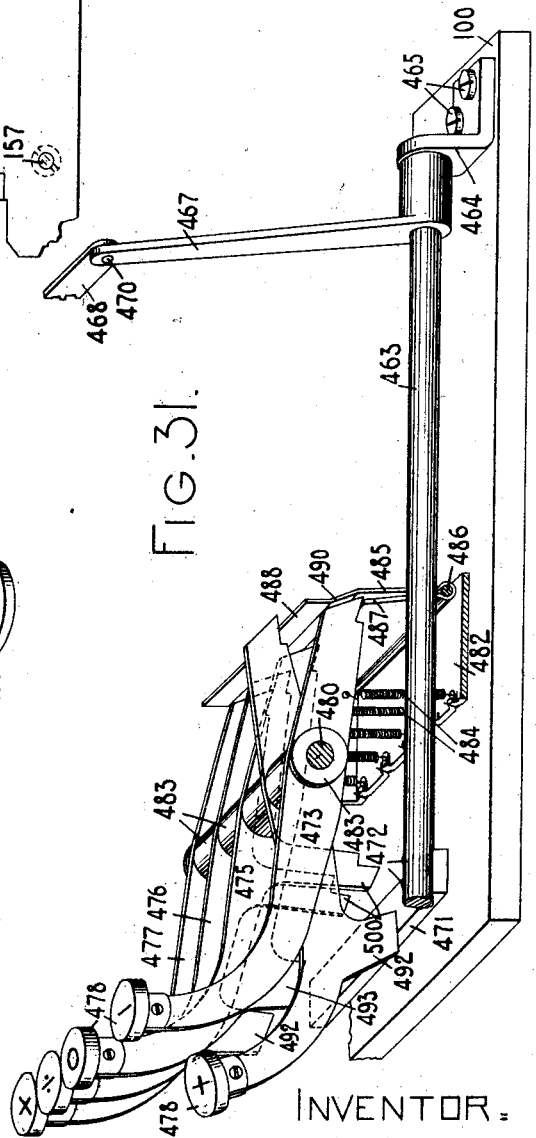
WITNESSES:
E. M. Wells
R. H. Strother
INVENTOR:
Arthur W. Smith
By Jacob Felbel
HIS ATTORNEY

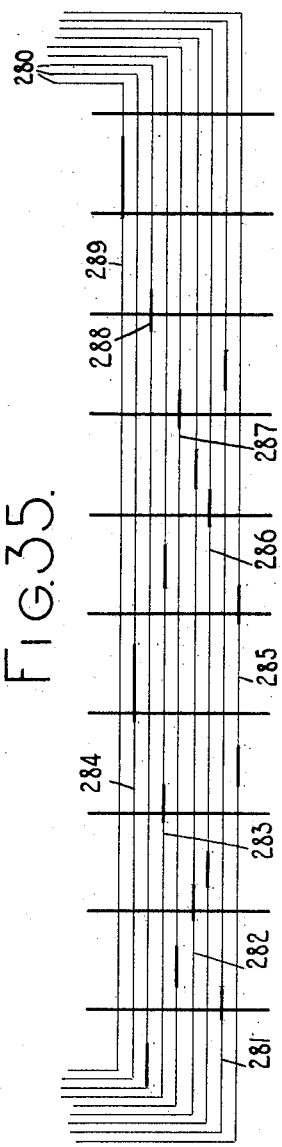
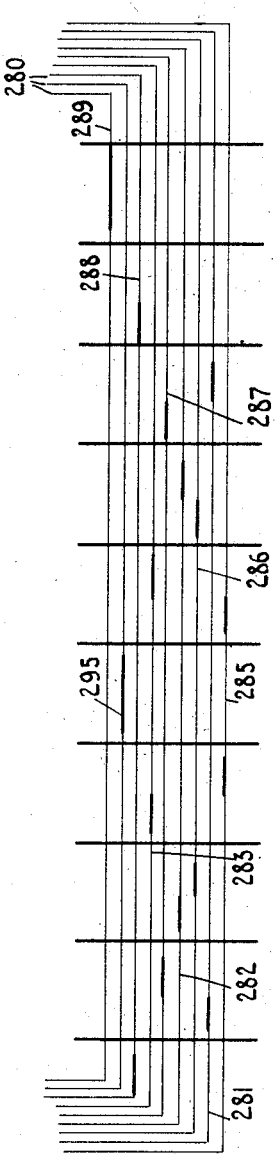
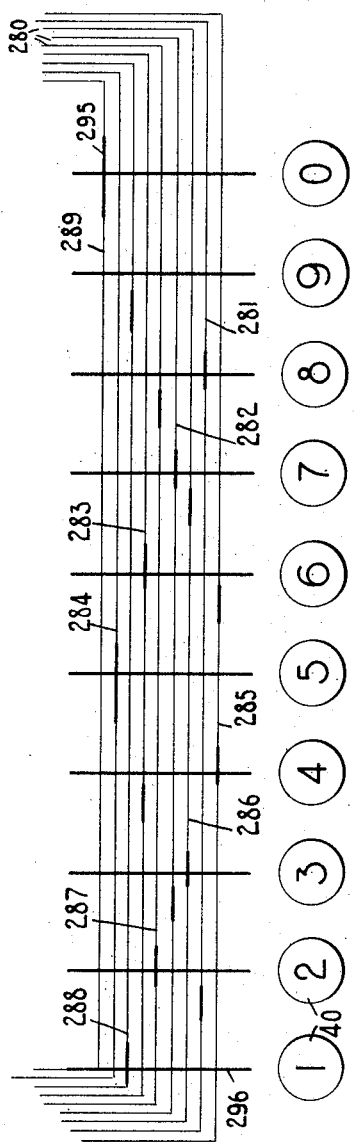

UNITED STATES PATENT OFFICE.

ARTHUR W. SMITH, OF NEW YORK, N. Y., ASSIGNOR TO YOST WRITING MACHINE COMPANY, OF ILION, NEW YORK, A CORPORATION OF NEW YORK.

COMBINED TYPE-WRITING AND COMPUTING MACHINE.

1,036,921.  Specification of Letters Patent.  Patented Aug. 27, 1912.

Application filed October 29, 1909. Serial No. 525,322.

*To all whom it may concern:*

Be it known that I, ARTHUR W. SMITH, citizen of the United States, and resident of the borough of Manhattan, city of New York, in the county of New York and State of New York, have invented certain new and useful Improvements in Combined Type-Writing and Computing Machines, of which the following is a specification.

My invention relates to computing machines and also to combined typewriting and computing machines.

My invention has for its principal object to provide an improved combined typewriting and computing machine wherein any desired matter may be written by the typewriting mechanism and wherein certain numbers written either alone or in conjunction with other typewritten matter may be automatically registered.

To these ends I have devised novel register mechanism; novel means for controlling the operation of the register of a computing machine; novel connections between the computing mechanism and the numeral keys of the typewriter; novel denomination selecting mechanism; novel means whereby said denomination selecting mechanism is controlled by the carriage of the typewriter; novel means for controlling the computing mechanism to perform the operations of addition, subtraction, multiplication and division; novel means for resetting the register to zero; certain safeguarding devices for preventing incorrect operation of the machine; novel means for affording punctuation of the numbers written and for varying the style of punctuation; novel indicating means for indicating the position of the denomination selecting device, and numerous features of construction and arrangement and combinations, all of which will be fully set forth herein and particularly pointed out in the claims.

One embodiment of my invention is illustrated in the accompanying drawings wherein like reference characters indicate like parts in the several views. Except where otherwise indicated said drawings are of natural size.

Figure 16:
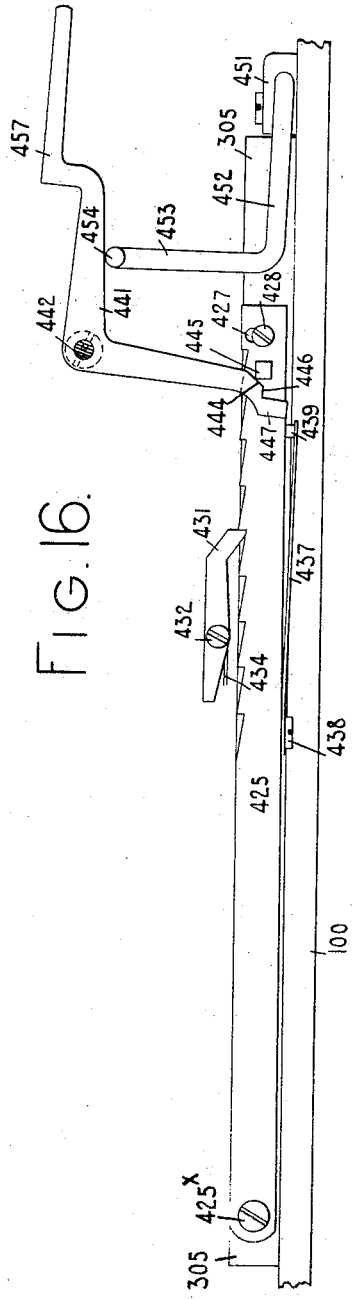

In said drawings, Figure 1 is a front to rear vertical sectional view showing the typewriter and the adding machine and the connections between them, the typewriter being shown in central vertical section and the adding machine being shown in section just inside the right-hand frame plate. Fig. 2 is a top plan view of the adding machine with the typewriter removed. Fig. 3 is a fragmentary top view of the register casing showing a certain indicator or scale in a different position from that illustrated in Fig. 2. Figs. 1, 2 and 3 are on a reduced scale. Fig. 4 is a front to rear vertical sectional view of the main part of the adding machine and showing the denomination selecting carriage in operative position and the section being taken about centrally through said carriage. Fig. 5 is a view similar to Fig. 4 but with some of the parts omitted and other parts shown in operated positions. Fig. 6 is a detail perspective view showing the innermost one and the outermost one of the nine nested setting-up levers. Fig. 7 is a right-hand side elevation of one of the register wheels. Figs. 8 to 12 inclusive are isometric views showing the several parts which go to make up one of the register wheel units. Fig. 8 shows the register wheel proper. Fig. 9 is a disk on which the register wheel or annulus is mounted and with which it is frictionally connected. Fig. 10 shows the flanged collar on which said disk is mounted. Fig. 11 represents another disk which is frictionally mounted on the collar shown in Fig. 10 and is frictionally connected with the register wheel. Fig. 12 shows the arresting device which is mounted on the collar shown in Fig. 10 and which arrests the register wheel. Fig. 13 is an isometric view of one of the friction springs by means of which the various parts shown in Figs. 8 to 12 inclusive are connected. Fig. 14 is a transverse central section through the register and looking toward the front of the machine. Fig. 15 is a rear elevation of the principal parts of the adding machine, the adding machine being shown in transverse vertical section just back of the denomination selecting carriage. Fig. 16 is a view similar to Fig. 15 and showing certain parts shown in said Fig. 15, but the parts being shown in a different position. Fig. 17 is a fragmentary top plan view of the upper rear part of the typewriter and the connections whereby the typewriter carriage controls the step-by-step motion of the denomination selecting device of the adding machine. Fig. 18 is a fragmentary rear elevation of the parts shown in Fig. 17. Figs. 19 and 20 are a bottom view and a right-hand side view respectively of a modified form of controller cam for controlling the denomination selection. Figs. 21 and 22 are similar views respectively of the third form of cam. Fig. 23 is a right-hand side view of the cam shown in Fig. 17. Fig. 24 is a fragmentary left-hand side elevation showing portions of the operating mechanism and the connections between said mechanism and certain other parts of the adding machine. Fig. 25 is a left-hand side elevation of part of the adding machine, the casing for the register being removed. Fig. 26 is an isometric view, slightly enlarged, of the detachable clip or connecting device whereby the numeral keys of the typewriter control the adding machine. Fig. 27 is a front elevation of the register. Fig. 28 is a left-hand side elevation, partly broken away and partly in section, showing the register, one of the setting-up units and part of the operating mechanism. Fig. 29 is a view similar to Fig. 28 but omitting some parts shown in said Fig. 28 and including parts of the zero setting mechanism not shown in said Fig. 28. In this figure the parts are shown in the position they occupy when the zero setting key is depressed. Fig. 30 is a fragmentary isometric view of the multiplication and division keys and certain parts controlled thereby, the division key being shown depressed. Fig. 31 is an isometric view showing the bank of keys including the multiplication, division, addition and subtraction keys and a disconnecting key and also showing certain parts connected with said keys. In this view the addition key is shown depressed. Fig. 32 is a right-hand side elevation of the setting-up unit for the lowest denomination. Fig. 33 is a view partly in section of one of the setting-up units, parts being omitted to show the arrangement of the stops. Fig. 34 is a front end view of one of the setting-up units. Figs. 35, 36 and 37 are diagrammatic plan views showing the parts immediately controlled by the keys. In Fig. 35 the parts are shown set for addition or multiplication; in Fig. 36 the parts are shown in inoperative position so that the typewriter keys have no effect on the adding mechanism, and in Fig. 37 the parts are shown in position for subtraction or division. Fig. 38 is a fragmentary rear view showing part of the carriage connections.

My invention is applicable, or may readily be adapted, to any sort of typewriting machine, but I have here shown it applied to a typewriter of that general class in which the printing keys and the types are mounted in a stationary frame-work and wherein a paper carriage is provided having a roller platen and moving step-by-step across the main frame in which the printing instrumentalities are mounted. In the present embodiment of the invention the typewriting machine and the computing machine are built separately, the main frame of the typewriter being mounted detachably on the top of the frame-work or casing of the adding machine, the construction being such that an ordinary typewriter can be set on the top of the adding machine and can be operatively connected with the adding machine by mounting on the typewriter a few attachments which are so constructed as to be readily added to the machine.

The main frame of the typewriting machine shown in the drawings comprises side plates 1, a front plate 2, a back plate 3 and a top plate 4, said top plate being supported by the side plates 1 and back plate 3. The side plates 1 support two stationary carriage rails 5 and 6, the former in front of the latter and said rails are formed with grooved ball races which coöperate with anti-friction balls or rollers 7 to support a carriage truck 8 for motion transversely of the machine. The truck 8 has a platen frame 10 mounted thereon by parallel links 11 and 12 each pivoted at its forward end to the platen frame and at its rear end to the truck, as shown in Fig. 1, so that the platen frame may be shifted up and down for upper and lower case writing. The platen frame 10 supports a roller platen 13 against the front face of which the types 14 are adapted to strike to print on the paper. It will of course be understood that the platen has coöperating therewith the usual or any suitable paper feed devices and line spacing mechanism, all of which, being old and well known in the typewriter art, it has been thought unnecessary to illustrate in the present drawings. The carriage is drawn from right to left by a cord 15 connected at its free end to the carriage and coiled about a spring drum 16, the shaft 17 of which is suitably mounted in lugs or brackets 18 depending from a frame bar 20 which connects the side plates 1 beneath the carriage. The carriage is provided with a feed rack 21 mounted at its ends on arms 22, each of which is pivoted at 23 to a lug 24 depending from the carriage truck 8. The rack bar is provided with rack or gear teeth on its forward edge, which teeth mesh with the teeth of a pinion 25 mounted on the upper end of a vertical shaft 26 which is journaled at its upper end in the cross bar 20 of the main frame, said shaft at its lower end being journaled in a second cross bar 27. The rack bar 21 is normally held in engagement with the pinion 25 by a spring 28 acting on a branch of the pivoted arm 22. It will be understood that the rack bar 21 and arms 22 constitute a yoke frame which may be swung toward the back of the machine about the pivots 23 to move the rack bar 21 out of engagement with the pinion 25.

Near its lower end the shaft 28 has mounted thereon and suitably connected therewith an escapement wheel 30 which is controlled by feed dogs 31 mounted on a dog rocker 32 forming part of a frame which extends across the base of the typewriter and which comprises a transverse rock shaft 33 pivoted at its ends in the side plates 1. Said rock frame also comprises forwardly directed arms 34 which are connected together at their forward ends by a universal bar 35 that lies beneath the entire series of printing key levers 36. These key levers are pivoted at their rear ends on a transverse fulcrum rod 37 which is secured at its ends to depending brackets 38 forming parts of the fixed frame-work of the machine. Each of the printing key levers 36 carries at its forward end a character key 40. It will of course be understood that the typewriter has a full set of character keys including keys for printing the letters of the alphabet and punctuation points and other characters, but only the numeral keys are shown in the present instance. Each of the key levers 36 is guided near its forward end by a comb plate 41 and each of said key levers is connected to a link 42 with the forwardly directed arm of a bell crank sub-lever 43, which in turn is connected by a link 44 with a pivoted driver 45 to which is pivoted at 46 a type bar 47, which at its forward end is pivoted at 48 to a guide link 49 and each of the type bars 47 carries at its rear end a type block containing two types 14, one of which types in the type action shown in Fig. 1 is adapted to print one of the ten digits or numerals.

The sub-levers 43 are each pivoted to individual hangers 51, each of which is fastened by a screw 52 to the front face of a sub-lever segment 53. Each of the drivers 45 is pivoted at 54 to an individual hanger 55 which is secured by screws 56 to the rear face of a segment 57. For the sake of rigidity the segments 53 and 57 are connected near their middles by a bar 58. The several guide links 49 are all pivoted on a pivot wire 60 which lies in a groove formed in the concave face of a segment 61, the rear face of which segment is formed with radial slots 62 in which the links 49 are arranged to play. The types 14 normally rest against an ink pad 63 mounted in a segmental trough 64 beneath the platen. The construction is such that when one of the keys 40 is depressed the corresponding driver 45 is thrown upward and toward the rear about its pivot 54 as a center and the type 14 on the corresponding type bar 47 is first lifted substantially radially off of the pad 63 until it reaches a point in front of the printing point on the front face of the platen when it is guided by a peculiar linkage, upon which it is mounted, into a path directly toward the platen, striking the front face of said platen. The path of the type is indicated by the broken line 65 in Fig. 1. It will be perceived that the type action resembles that of the Yost typewriter but is adapted for a front-strike machine. It will be understood that the type bars 47 and the drivers 45 are arranged in an arc or segment of a circle about the printing point on the front face of the platen after the fashion of a front-strike typewriter. Whenever one of the printing keys is depressed the key lever 36 strikes the universal bar 35 and operates the feed dogs 31, permitting the escapement wheel 30 to move a tooth space and permitting the carriage to move a letter space distance under the impulse of the spring drum 16.

A denominational tabulator is provided on the typewriting machine in order to facilitate the writing of matter in vertical columns and especially to facilitate the writing of numbers in columns with the digits of each denomination in alinement. The tabulator shown in the present instance comprises a column stop bar 66 arranged at the rear of the carriage and supported on the carriage truck by means of brackets 67. As best shown in Figs. 17 and 18 this column stop bar is of the general form, being square in cross section and having in two opposite faces thereof transverse slots 68 arranged a letter space distance apart for the accommodation of adjustable column stops 70. These column stops are generally made of sheet metal and bifurcated to embrace the column stop bar, the arms of the column stop fitting into two opposite grooves 68 so that the column stops are adjustable lengthwise of the bar to any desired letter space position by removing them from the bar and inserting them in any desired pair of slots 68. In the form of tabulators shown in the drawings, each column stop has a depending part 71 which is adapted to coöperate with any one of a series of denomination stops 72, each of said denomination stops in the present instance consisting of the upper end of the upwardly extending arm 73 of a bell crank lever having a forwardly extending arm 74 that lies beneath the printing mechanism extending toward the front of the machine. The bell cranks 73, 74 are each pivoted at its angle on the fulcrum rod 75 mounted in a U-shaped bracket 76 secured to the rear plate 3 of the main frame of the typewriter. The arm 74 of the bell cranks fan outward toward the front of the machine and each of them has pivoted to its forward end the stem 77 of a denomination key 78, said denomination keys being raised in a tier or transverse row at the back of the key board of the machine. The bell cranks are maintained in normal position by returning springs 80, one for each bell crank, said springs, as shown in the present instance, being connected with the arms 74 near the forward ends of the latter and also with the plate 41. The upper ends of the arms 73 of these bell cranks are guided in suitable slots in a comb plate 81. Seated in the top plate 4 of the typewriter and having fore and aft extending slots spaced a letter space distance apart, this comb plate maintains the several denomination stops 72 properly spaced apart and the motion of each of said denomination stops is limited by the length of its slot, these stops being normally maintained in the rear ends of their respective slots by the springs 80 and being moved forward whenever the denomination keys 78 are depressed. A universal bar 82 lies in front of all of the lever arms 73, said universal bar being mounted on a lever 83 pivoted between its ends at 84 to a bracket 85 depending from the frame bar 20. At its upper forward end the lever 83 carries a shoe 86 that lies in front of the carriage feed rack 21. The construction is such that when one of the tabulator keys 78 is depressed the corresponding denomination stop 72 is moved forward into the path of the column stop 71 and at the same time the lever 83 is rocked about its pivot forcing the feed rack 21 toward the rear of the machine out of engagement with the pinion 25, thus releasing the carriage from the control of its escapement wheel. The carriage is then drawn toward the left by a spring drum 16 until it is arrested by the coöperation of the stops 71 and 72. It will be perceived that the adjustment of the stop 71 on the bar 66 determines the position of a column of figures on the paper and that the carriage may be brought to any denominational position in the column thus determined by operating the appropriate denomination key 78.

The typewriting machine partially shown in the drawings and briefly described above, forms no part of the present invention except as it enters into combination with the computing mechanism presently to be described; and it will of course be understood that any other known or suitable form of typewriting mechanism may be used in combination with the computing mechanism without departing from my invention. Many of the features of the typewriting machine shown and described are of my invention and they form the subject-matter of certain pending applications of mine.

The typewriting machine shown is manufactured for separate use as a typewriting machine.

The main frame of the computing machine comprises a substantially rectangular casing having side plates 90, a back plate 91, a right-hand front plate 92 and a left-hand front plate 93. A square cross bar 94 extends across the front of the rectangular part of the casing and is connected with the front plates 92 and 93 by screws 95. As best shown in Fig. 1, the front plate 2 of the typewriter rests on this bar 94 and on the front plates 92 and 93. The side plates 1 of the typewriter frame constitute in effect upward continuations of the side plates 90 of the computing machine. The back plate 91 of the casing of the computing machine is however situated a short distance to the rear of the back plate 3 of the typewriter and the intervening space is covered by a shelf 96 constituting part of the computer casing. In order to insure that the typewriter is accurately positioned on the computer, lugs 97 are secured to the cross bar 94 and lugs 98 to the shelf 96, these lugs extending upward in such position as to cause the typewriter to be accurately positioned on the computer casing.

Most of the computing mechanism is supported by a heavy base plate 100 which occupies the lower forward part of the computer casing being secured to the side plates 90 and to the front plates 92 and 93 by screws 101 (Fig. 2). The part of the machine that contains the register wheels projects out in front of the typewriter and in front of the front plates 92 and 93 as indicated in Fig. 2 and the base plate 100 extends forward beneath the register wheels having the general outline in this respect indicated by the outline of the casing as seen in Fig. 2.

The register wheels are mounted in the forwardly projecting part of the casing on a hollow shaft or sleeve 102 (Fig. 14) which is journaled at or near its ends in brackets 103 rising from the base plate 100 to which said brackets are secured by screws 104. The hollow shaft or sleeve 102 has journaled therein a rock shaft 105 for a purpose which will appear hereinafter. Endwise motion of the sleeve 102 in one direction is prevented by a collar 106 which surrounds said sleeve outside of the left-hand bracket 103 to which said collar is secured as by a set screw. Just inside of each of the brackets 103 an arm 107 (Fig. 28) projects from the shaft 105 through a peripheral slot 108 in the sleeve 102 in such fashion that when the shaft 105 is rocked it may move independently of the sleeve 102 until the post 107 comes to the end of the slot 108, after which the sleeve will be carried along with the shaft. The purpose of this construction will appear hereinafter and the construction is mentioned now only to call attention to the fact that these posts 107, being just inside of the brackets 103, prevent endwise motion both of the sleeve 102 and also of the shaft 105. As was said above, the collar 106 also assists in this regard.

Each of the registering units is built up of the several parts shown in Figs. 8 to 13 inclusive, these parts being put together in the manner indicated in Fig. 7 and also in Fig. 14, it being understood that in Fig. 14 the observer is looking from the back toward the front of the machine. Each of said registering units comprises a collar 110 mounted on the sleeve 102 and rigidly secured in place on said sleeve by means of a set screw or set screws 111 threaded through holes 112 in the collar and engaging the sleeve. The collar 110 is formed with a flange 113, this flange being in the nature of a disk or annulus. On the left-hand side of the flange 113 there is mounted on the collar 110 a disk or annulus 114 and on the right-hand side of said flange there is mounted on said collar a second disk or annulus 115, the disk 115 being of slightly greater diameter than the disk 114. In order to secure together the two disks 114 and 115 and to press them into frictional contact with the flange 113 the disk 115 is formed with two cut-outs 116, each having its end nearest the shaft 102 formed on a bevel 117 and spring clips 118 lie in the cut-outs 116 as indicated in Fig. 14. As best shown in Fig. 13 each of these spring clips is formed with two ears 120 bent down from one end thereof and also with a hole 121. A screw 122 (Fig. 14) passes through the hole 121 and is threaded into a hole 123 (Fig. 9) in the disk 114. The ears 120 of the spring clip enter peripheral notches 124 in the disk 114 to prevent the clip from turning about the screw 122 as a pivot. It will be perceived that if the screw 122 be tightened the inner end of the clip 118, pressing against the disk 115, will clamp the two disks together, causing them to bear against the flange 113 with spring pressure, the amount of which can be regulated by tightening or loosening the screws 122. It will be perceived that there are two of these spring connections between the two disks, said spring connections being substantially diametrically opposite each other.

The register wheel proper, as shown in Fig. 8, consists of an annulus 125 having ratchet teeth formed in its peripheral surface with the numerals "0", "1", "2", "3", "4", "5", "6", "7", "8", "9" stamped or otherwise formed or imprinted on the faces of the ratchet teeth. In the present instance each register wheel has forty teeth marked with four series of digits. As will be understood by reference to Figs. 8 and 14, the register wheel has an internal annular flange 126 of such internal diameter as to fit loosely about the periphery of the disk 114. Said register wheel has in its right-hand face a cut-out in which the disk 115 has a working fit, said disk contacting with the right-hand face 127 of the internal flange 126. Two spring clips 118' are secured to the left-hand face of the disk 114 by screws 128 (Figs. 7 and 14), which screws are threaded into holes 130 (Fig. 9) in the disk 114. The spring clips 118' are substantially like the clips 118 and each of them has the ears 120 which project into slots 131 in the disk 114 so as to prevent turning of the clip about the screw 128 as a center. These spring clips 118' prevent the annular register wheel from slipping off of the disk 114 and by tightening the screws 128, these clips are put under spring tension, thus clamping the flange 126 of the register wheel between the disk 115 on the one hand and the clips 118' on the other. By this means the annulus 125 is frictionally connected with the disks 114 and 115 and the amount of friction between these parts may be regulated by adjusting the screws 128. It will be perceived that the disks 114 and 115 are constrained to move together and that therefore they constitute in effect a single part of the mechanism; that said disks are frictionally connected with the flanges 113 and, therefore, with the hollow shaft 102 on which said flanges 113 are rigidly mounted; and that the annular register wheels 125 are in turn frictionally connected with the disks 114, 115. Some other form of yielding connection could be substituted for the frictional connection between the disks 114, 115 and the flange 113.

In order to enable the screws 122 and 128 to be adjusted after the parts have been assembled as shown in Fig. 14, I form in each of the disks 114 and 115 a hole 132, which hole is somewhat elongated radially of the disks. These holes 132 in the two disks are in register with one another and when the parts are in normal position said holes occupy the position shown in Fig. 4, the holes 132 for the entire series of registering units being in alinement so that a screw-driver can be run in endwise of the series to any desired extent. If any of the screws 122 or 128 requires adjustment the registering unit of which this screw forms part may be turned by hand to bring the screw into alinement with the holes 132 of the remaining units and a screw-driver may be inserted from the right-hand end of the series if it is one of the screws 122 that requires adjustment, or from the left-hand end of the series if it is one of the screws 128 that requires adjustment.

Each of the collars 110 has mounted thereon a stop piece or plate 133 which is in the form of a plate of sheet metal surrounding the collar 110 and secured to the disk 115 by screws 134 (Fig. 4) passing through holes 135 in the stop piece and threaded into holes 136 in the disk 115. It will be perceived that the stop piece 133 and the disks 115 and 114 constitute in effect an operative connection between the register wheel 125 and the flanged collar 110 which is secured upon the shaft 102. Each of these operative connections constitutes an individual actuator or driver which is frictionally or yieldingly connected with its individual register wheel and each of these actuators is frictionally connected with the shaft 102 which constitutes a common actuator or driver for the entire series of register wheels. The stop piece 133 has a stop arm or nose 137 and at a certain distance from the working end of this stop nose, toward the front of the machine, a stop lug 138 is bent off from the plate 133 toward the right. As will more clearly appear hereinafter the motion of the stop pieces 133 is controlled by certain key-controlled stops which coöperate with the parts 137 and 138 to limit the forward motion of the stop pieces; and by the forward motion of the stop pieces I mean a motion away from normal position, as distinguished from the return motion. In the present instance, the forward motion of the upper part of each stop piece is toward the rear of the machine. After a number has been set up by the keys by operating the stops just referred to, the shaft 102 is oscillated by an operating handle and connections to be hereinafter described, said shaft moving first in a forward direction, that is to say, toward the rear of the machine a distance somewhat in excess of a quarter turn, then back again. If a number has been written in the denomination corresponding to any particular register wheel the stop piece 133 will have been released and a limiting stop will have been thrown into the path either of the nose 137 or of the lug 138. When the shaft 102 is rocked forward the individual actuator of that register wheel will be moved forward until it is arrested by the key set stop, carrying the register wheel with it. On the return stroke of the shaft 102 the stop piece 133 will be carried back to normal position but the register wheel will be held in its advanced position by a pawl 140 (Figs. 4, 25 and 27) engaging the ratchet teeth of the register wheel, which ratchet teeth and pawl are so disposed as to allow of forward rotation of said register wheel but to prevent backward rotation thereof. There is a pawl 140 for each register wheel and the entire series of pawls are pivoted on a pivot wire 141 secured to a plate 142 which in turn is secured to the base plate 100 near the extreme forward end thereof. The forward face of the plate 142 is formed with a series of tongues 143 which alternate with the pawls 140 and are bent up and around the pivot wire 141 after the fashion of a hinge. The rear part of the plate 142 is bent upward forming a flange 144 to which are secured the rear ends of a series of light contractile springs 145 which at their forward ends are connected with the several pawls 140 and press said pawls against the register wheels. In order to provide for an up and down adjustment of the entire series of pawls the plate 142 is not secured directly to the base plate 100 but rests on an inclined plate 146 having at its forward edge a depending flange 147 that rests on the base plate 100. The plates 142 and 146 are together secured to the base plate 100 by bolts or screws 148 having nuts 149. These bolts pass through slots in the inclined plate 147 so that said inclined plate may be adjusted in a front or back direction to lower or raise the plate 142 before the bolts are tightened. This device gives a very fine adjustment of the pawls.

As best shown in Fig. 27 each of the pawls 140 is wider than is necessary for coöperation with its register wheel and it has an upwardly extending projection 151 that lies by the side of the register wheel in position to arrest, in its normal position, a forwardly extending arm 152 of the stop piece 133.

In order to insure positively the complete return of each of the stop pieces 133 upon the return stroke of the shaft 102, said stop piece has bent off therefrom a lug 153 in position to be struck by one of the screws 111 which is elongated for the purpose (Figs. 4 and 5). When the parts are in the normal position shown in Fig. 4 this screw 111 is in contact with the lug 153 and the arm 152 is in contact with the upward projection 147 of the pawl 140. If the tension on the clips 118 is tighter than that on the clips 118′, the individual actuator will be restored to normal position by friction; but whether this actuator is so restored or not, its restoration is positively insured by the screw or pin 111 and the lug 153.

The key-controlled stops which coöperate with the stop piece 133 to control the forward motion of the register wheels in accordance with the digits to be added, may be understood by reference to Figs. 15, 33 and 34. There are ten of these stops for each denomination and each denominational group of stops is mounted in an individual support which is designated as a whole by the reference numeral 154. Each of these stop supports is plate-like in form and stands vertically at the rear of the corresponding register wheel, or rather, each support has its central plane substantially coincident with the plane of the right-hand face of the corresponding stop piece 133. Each stop support consists of a right-hand plate 155 and a left-hand plate 156 arranged face to face and secured together by screws 157. Each of the stop supports has its forward end adjacent to the corresponding register wheel and at said forward end the upper part of the support is cut out as indicated in Fig. 32 at 158 in the arc of a circle concentric with the shaft 105. The right-hand plate 155 has five grooves 159 cut in its left-hand face lengthwise of the plate and extending toward the rear at a downward inclination as shown in Fig. 33. As shown in Fig. 34 these grooves are of such form that when the plate 155 is in position against the plate 156 said grooves form square holes extending lengthwise through the stop support. The plate 156 is formed with four grooves 160 similar to and parallel with the grooves 159 and alternating with said grooves 159. These grooves 160 are closed by the plate 155 forming another set of holes through the stop support, the two sets of holes being arranged in staggered relation as will be clearly understood from Fig. 34. Each of the plates 155 and 156 thus serves as a cover plate for the grooves in the other of the two plates. The digit stops 161, 162, 163, 164, 165, 166, 167, 168 and 169 consist of pieces of square wire lying in the holes 159 and 160 and normally having their forward ends substantially flush with the curved surface 158 and their rear ends projecting from the rear end of the stop support as indicated in Fig. 33. As will be understood by reference to Figs. 2, 15 and 33, the rear end of each of these stop wires is bent at right angles forming a finger 170, each of said fingers projecting a short distance beyond the right-hand face of the plate 155. Any one of the stop wires may be pushed toward the front of the machine, throwing its forward end into the path of the nose 137 of the stop piece 133 or lug 138. Those wires that are mounted in the plate 156 stand when projected in the path of the nose 137 and those mounted in the plate 155 stand in the path of the lug 138. The wires are retained either in their operative or inoperative positions by friction and to this end each of the wires before being inserted in the plate is slightly sprung so as to be normally slightly curved instead of perfectly straight. When the wires are inserted in the straight slots 159 and 160 they have to be sprung straight and they are thus placed under frictional restraint in the slots.

Above the slots 160 the plate 156 has a fifth slot 171 in which lies a retaining stop wire 172 which, as indicated for example in Fig. 4, is normally in its projected position in which position it coöperates with the nose 137 to retain the corresponding stop piece 133 in its normal position. The slot 171 is not formed with the downward inclination of the remaining slots but is substantially horizontal. The plate 155 has in its upper edge a notch or cut-out 173 and the rear end of the stop 172 is bent to the right forming a finger 174 which projects through the cut-out 173 and it is by means of this finger 174 that the stop 172 is controlled. As will presently appear, means are provided whereby whenever one of the stops 161–169 is projected to operative position the stop 172 is withdrawn, thus leaving the corresponding stop piece 133 free to move forward when the shaft 102 is operated. The slots 160 are spaced from the slot 171 and from one another to correspond with the spacing of the ratchet teeth on the register wheel. The stops 161–169 correspond respectively to the digits "1" to "9." The stops 161, 162, 163 and 164 are mounted in the slots 160 of the plate 156 and they coöperate with the nose 137 to arrest the stop piece 133 after one, two, three or four units of forward motion of said stop piece. The stop 165 corresponding to the digit "5" occupies the uppermost one of the slots 159 and this stop is situated one-half unit distance below the "0" stop 172. The lug 138 is situated on the stop piece 133 a distance back of the nose 137 equal to four and one-half ratchet teeth of the register wheel 125. It will thus be seen that if the stop 165 be projected to operative position and the stop 172 be withdrawn, the stop piece 133 will be free to move five units before it is arrested by the lug 138 contacting with the stop 165. The remaining stops 166, 167, 168 and 169 are spaced a unit's distance apart beneath the stop 165 so that these stops are adapted to allow to the stop piece 133 motions of six, seven, eight and nine units respectively. By thus providing two stop portions on the stop piece 133 and arranging the key-controlled stops in the staggered fashion shown, it will be seen that I am enabled to group all of said key-controlled stops in a much smaller fraction of the circumference of the ratchet wheel than would otherwise be possible.

An individual universal bar 175 (Figs. 4 and 5) is provided for each set of key-controlled stops. This universal bar consists of a plate of sheet metal mounted on the side of the plate 155 by means of a headed and shouldered screw 176 which passes through an elongated slot 177 in the plate 175 and is threaded into the plate 155, the construction being such that the plate 175 is free to slide for a limited distance in a front or back direction. Said plate 175 normally occupies its rear position as shown in Fig. 4 with its rear edge in contact, or substantially so, with each of the fingers 170 bent off from the several stop wires. When any of the stops 161–169 is thrust forward to operative position the finger 170 thereof pushes the universal bar to its forward position as indicated in Fig. 5. Near its front end the universal bar or plate 175 has a notch 178 cut in its lower edge and in this notch rests the enlarged upper end of an arm 180 of a three-armed lever pivoted on a pivot screw 181 threaded into the plate 155. Said lever has a forwardly extending arm 182 with a depending tooth or foot 183 and said lever also has a rearwardly extending arm 184 having a depending foot 185. The construction is such that when the parts are in their normal positions shown in Fig. 4 the foot 185 projects below the lower edge of the stop support 154 and when the universal bar is in its operated position the foot 183 projects below said stop support as shown in Fig. 5. It will be seen that when the universal bar is moved one way or the other the three-armed lever is rocked about its pivot and, vice versa, if said three-armed lever be rocked about its pivot it will move the universal bar. This lever also supports the forward end of the universal bar. Above the forward end of the universal bar a straight lever 186 is pivoted on a screw 187 which is threaded into the plate 155 and the lower rounded end of this lever rests in a notch 188 formed in the upper forward corner of the universal bar 175. The notch 178 has both front and rear walls but the notch 188 has only a rear wall, the lower arm of the lever 186 being free to move toward the front of the machine independently of the universal bar and the universal bar being free to move toward the rear of the machine independently of the lever. The finger 174 of the retaining or "0" stop 172 passes through a hole in the upper end of the lever 186. The construction is such that when one of the digit stops is operated and the universal bar is moved toward the front to the position shown in Fig. 5, the lever 186 withdraws the stop 172 as indicated in said Fig. 5. It will be perceived that if the universal bar be forced from the position shown in Fig. 5 toward the rear to the position shown in Fig. 4 by rocking the lever arm 180, said universal bar will restore to normal position whatever digit stops may have been operated in that particular group. The universal bar is thus restored by the operating mechanism to be hereinafter described, but as will be seen from an inspection of Fig. 5, this restoration of the universal bar may take place at a time when the curved rear edge of the stop piece 133 is below its normal position in which case said stop piece would stand in the path of the retaining stop 172 and prevent said retaining stop from being restored to normal position until the stop piece 133 shall have been completely restored to its normal position shown in Fig. 4. For this reason the lever 186 is not positively connected with the universal bar 175 on the return stroke of said universal bar, but is connected with one end of a light contractile spring 190 which is connected at its other end to the universal bar 175. In order to accommodate this spring a shallow groove 191 is milled in the face of the plate 155. If the universal bar is restored to its normal position before the stop piece 133 has been fully restored to normal position the stop 172 will be thrust forward until its forward end contacts with the rear edge of the stop piece 133 and the universal bar will continue its motion independently of the lever 186, stretching the spring 190, said rear edge of the stop piece 133 being made on the arc of a circle for this purpose. As soon as the stop piece 133 reaches its normal position, shown in Fig. 4, the stop 172 snaps forward under the impulse of the spring 190. From what has been said it will be seen that it is not desirable that the stop wire 172 be placed under any frictional restraint but it is preferable that it slide freely in its groove. This stop wire therefore is not bent and sprung into its groove like the others but is made straight and fits loosely in the groove 171.

The transfer mechanism comprises means whereby when any register wheel passes from its "9" to its "0" position, the entire group or gang of key-controlled stops for the next register wheel of higher denomination is caused to drop down a distance equal to one increment of motion of a register wheel. It will be perceived that whether or not a digit is being added at the time on the register wheel of higher denomination, this will effect the transfer correctly. If no number is being added on the higher register wheel its stop piece 133 will have its nose 137 resting on the retaining stop 172 and if this stop drops down a unit's distance, "1" will be added on the wheel. If, on the other hand, some number is being added at the time on the register wheel of higher denomination then the operative one of the stops 161-169 will be dropped a unit's distance below its normal position and the stop piece 133 will be allowed one more increment of motion than that indicated by the stop. To this end the stop supports 154 are not rigidly mounted but are pivoted near their rear ends on a frame rod 192 which is supported at its ends in brackets or standards 193 and 194 rising from the base plate 100, to which they are secured in any suitable manner as by screws. The rod 192 is prevented from slipping out of the brackets endwise by collars 195 mounted on the ends of the rod and secured in place by set screws. In order to space the stop supports apart on the rod 192 I have provided pins or lugs 196, one projecting from the right-hand face of each of the stop supports and adapted to contact at its end with the next succeeding stop support. The rod 192 passes through holes 199 (Fig. 32) in the upper rear parts of the stop carriers, said rod being situated as nearly as may be so that a line through the center of the rod and through the center of the shaft 105 would pass about midway between the stops 172 and 169. In order to guide the lower rear ends of the stop carriers a plate 197 (Fig. 4) is secured to the base plate 100 by screws 198 and said plate 197 is bent up to form a flange which is slotted to form a comb plate, each of the plates 154 lying in one of the slots or notches of said comb plate. As the thickness of the stop carriers 154 is greater than the space between them, I prefer to form a notch 200 in each of the plates 156 as indicated in dotted lines in Fig. 5 and in full lines in Fig. 28 so that it is only the corner of the plate 155 that lies in the notch in the comb plate 197. In order to guide the forward ends of the stop carriers 154 I provide in front of said forward ends an angled plate or strip 201, one flange of which is secured to the base plate 100 by means of screws 202. The plate 201 has at its upper part a second flange directed rearward and slotted to form a comb plate to guide the forward ends of the stop carriers as will be understood by reference to Figs. 4 and 5. For coöperation with this comb plate there is formed at the lower forward corner of the plate 155 a projection 203. I prefer not to extend the plate 156 forward to correspond to this projection in order to give wider fingers to the comb plates 201. It will be perceived that each of the stop carriers 154 is pivoted to swing about the rod 192 as a center, the forward end of the stop carrier having a motion up and down.

The forward end of the stop carrier is normally maintained in its upper position shown in Fig. 4 by a trip lever 204 pivoted at its forward end on a pivot screw 205 threaded into the forward projection 203 of the plate 155. The lever 204 is formed a short distance back of the pivot 205 with a heel 206 which rests on the base plate 100. The lever is extended from said heel some distance toward the back of the machine where it is formed with an upstanding arc-shaped arm 207 having a notch 208 in its forward edge. The notch 208 is normally engaged by the lower rear end of a trip lever 210 which is pivoted between its ends on a pivot screw 211 threaded into the plate 155, the lever being moved into engagement with the notch 208 by means of a light spring 212 fastened at one end to the lever and at its other end resting on a pin 213 projecting from the stop carrier. The upper forward arm of the lever 210 terminates near the upper corner of the stop carrier and at its end said lever is formed with an inclined or cam face 214 which stands in the path of transfer lugs 215 projecting from the periphery of the register wheel of next lower denomination. As in the present construction each register wheel has four sets of digits on its periphery, each wheel is also provided with four of these transfer lugs 215. Each of said transfer lugs has an inclined end adapted to strike the cam edge 214 of the trip lever 210 of the next higher denomination, camming the upper end of the lever 210 toward the rear of the machine and forcing the lower end of said lever toward the front of the machine out of the notch 208. When the lever 210 moves out of said notch there is no longer any support for the free end of the stop carrier on which the lever is mounted and said stop carrier accordingly drops to the position shown in Fig. 5 where it is arrested by the straight lower edge 216 of the lever 204. In this position of the parts the lower end of the lever 210 is received in the angle between the horizontal arm of the lever 204 and the upstanding arm 207 of said lever which prevents further motion of the lever 204 with relation to the stop carrier 154. In Fig. 5 of the drawings the key-controlled stop 164 is shown in the act of arresting the nose 137 to add four on the register wheel, but this register wheel is receiving an additional increment of motion, due to the transfer from the next wheel of lower order, so that the number actually added is five.

The above description of the transfer mechanism applies to all of the stop carriers except that of lowest denomination. The right-hand face of the stop carrier of lowest denomination is shown in Fig. 32 where it will be seen that this stop carrier is provided with a short lever 217 pivoted on a screw 205 and having the engaging heel 206 the same as the levers 204. The lever 217, however, does not have the upward extension 207 nor is it controlled by a trip lever 210 but it has a rearwardly extending arm 218 for coöperation with other parts of the machine to be hereinafter described. The function of the lever 217 has to do with the operations of subtraction and division as will appear hereinafter.

The operating mechanism includes an operating crank handle 220 projecting from a crank arm 221 at the left-hand side of the computing machine and normally standing in the position shown in Figs. 2 and 25. The crank arm 221 is rigidly mounted on the outer end of a shaft 222 which passes through the casing plate 90 and which at its inner end has rigidly mounted thereon a gear segment 223 which meshes with a gear segment 224 rigidly mounted on the end of the shaft 105 which passes through the axis of the register. As here shown the gear 224 is secured on the end of the shaft 105 by means of a pin 225 passing through the hub of the segment and through the shaft.

The shaft 222 is journaled in two brackets 226 and 227, each mounted on the base plate 100 to which it is secured by screws. Endwise motion of the shaft 222 in its bearings in one direction is prevented by a collar 228 mounted thereon just inside the left-hand bracket 226 and secured to the shaft by a set screw. Endwise motion of the shaft in the opposite direction is prevented by the hub of the gear segment 223 contacting with the outer face of the bracket 227.

I have provided a full stroke and stop device for the crank arm 221 which device comprises a toothed sector or a segment of a toothed annulus 230 mounted concentrically with the shaft 222 and secured to the outer face of the casing 90 by screws 231 and 232. The periphery of this sector is formed with square teeth with which the points or teeth 233 and 234 of a double pawl 235 are adapted to engage. The pawl 235 is pivoted to the inner side of the crank arm 221 on a pivot screw 236 and said pawl is provided with an arm 237 between the two teeth 233 and 234. As shown in Fig. 2 the teeth 234 and 233 of the pawl are broad enough to engage the segment 230, whereas the arm 237 is thinner and lies between the segment 230 and the crank arm 221. The arm 237 when the crank handle is pulled toward the front of the machine is adapted to strike against a stop pin 238, which in the present construction is shown as consisting of the elongated head of a screw, threaded into the segment 230. In the forward motion of the lever arm from the position shown in Fig. 25, the tooth 233 snaps over the teeth of the segment until the arm 237 encounters the pin 238 when said pin reverses the pawl, forcing the tooth 234 into engagement with the segment and arresting the forward motion of the crank arm. When the crank arm is pushed toward the rear the tooth 234 snaps over the teeth of the segment until the arm 237 encounters the head of the screw 232, which screw head is elongated to constitute a stop which both reverses the full stroke pawl and limits the backward motion of the handle. The point of the arm 237 coöperates with a spring 239 which is secured to the crank arm 221 by a screw 240. The spring 239 is bent as shown in Fig. 25 so as to provide said spring with an inclined part 241 with which the arm 237 contacts when the pawl is in one position and with another inclined part 242 with which said arm contacts when the pawl is in the other position.

While the full stroke pawl is adapted to arrest the operating handle, nevertheless, I prefer to provide an additional stop for the forward stroke of the handle and to make said additional stop adjustable in order to avoid straining the parts. To this end, as shown in Figs. 2 and 24, I provide a bracket 243 which is secured to the base plate 100 and extends therefrom at an upward and forward inclination in such position that the rear edge of the gear segment 223 strikes and is arrested by the under side of said bracket. The bracket is secured to the base plate by screws 244 passing through an elongated slot in the bracket and threaded into the base plate, whereby the bracket is made adjustable in a front and back direction.

As has been explained hereinbefore the shaft 105 is loosely journaled in the hollow shaft 102 and said shaft 105 has two posts 107 projecting therefrom through slots 108 in the shaft 102, all as shown in Fig. 28, the construction being such as to permit a limited amount of lost motion between the shafts 105 and 102. The posts 107 are normally maintained in the lower ends of the slots 108 as shown in Fig. 28 by means of a coiled spring 245 (Figs. 2 and 25) coiled about the outer end of the shaft 105 and at one end hooked around the gear segment 224 and at the other end secured to the collar 106 which, as has been explained, is rigidly mounted on the hollow shaft 102, the construction being such that the spring 245 tends to turn the shaft 105 with relation to the shaft 102 toward the rear of the machine; that is to say, in the direction which has been described as a forward direction.

When a number has been set up on the machine by operating the key controlled stops 161–169 the handle 220 is drawn forward until it is arrested by the stop 243 and it is then pushed backward until it is arrested by the pin 232 and said handle is then released. The forward stroke of the handle imparts the "forward" stroke to the shaft 105 which, as will be understood by an inspection of Fig. 28, carries the shaft 102 with it from the beginning of the stroke. When the handle 220 is started toward the rear of the machine the shaft 105 begins at once to turn toward the front of the machine, but the shaft 102 does not begin its return motion until the post 107 reaches the upper end of the slot 108, after which the two shafts move together until the handle 220 completes its return stroke which, as will be understood, is in a position below that shown in Fig. 25. When the handle is released the spring 245 turns the shaft 105 toward the back of the machine until the post 107 reaches the lower end of the slot 108, the parts being arrested by the post 107 contacting with the end of the slot. This motion brings the handle 221 up to its normal position shown in Fig. 25. The purpose of this lost motion between the two shafts will be explained hereinafter. It will be seen that a complete operation of the handle consists of three parts. Said handle is first drawn from the normal position shown in Fig.

25 to its extreme forward position, it is then pushed to its extreme rear position, and it is then moved by the spring 245 forward to normal position.

On the forward stroke of the shaft 102 the stop piece 133 of each of those denominations in which key-controlled stops have been operated, moves forward carrying its register wheel with it until the stop piece is arrested, but all of those stop pieces whose key-controlled stops have not been operated are retained against motion, the flanges 113 slipping between the disks 114 and 115. On the return stroke of the shaft 102 all of the stop pieces 133 that have been moved, are restored to normal position but the register wheels are held against return motion by the pawls 140, the clips 118' slipping on the register wheels.

In order to restore to normal position any key-controlled stops that may have been operated and also any stop carriers that may have dropped down to transfer, I provide a transverse bar 246 (Figs. 4 and 5) which ordinarily lies beneath the series of feet 183 that depend from the lever arms 182; and means are provided whereby on the return stroke of the operating handle this bar 246 is drawn up as indicated in broken lines in Fig. 28. In order to provide room for this bar and for some other parts of the mechanism the base plate 100 is cut away as indicated in the drawings. The bar 246 constitutes part of a U-shaped frame having upright arms 247 which at their upper ends are pivotally and yieldingly connected with horizontal levers 248, which at their rear ends are pivoted on the rod 192, one of said levers being at the right side and the other at the left side of the series of stop carriers 154. A round pin 250 passes vertically and loosely through each of the levers 248, as indicated in Fig. 28, and at its lower end this pin is thinned away to form a flat portion that enters a slot in the end of the arm 247 and the two parts are pivoted together by a pivot pin 251. Two stiff springs 252 and 253 are secured to the under side of the lever 248 by a screw 254 and one of these springs is bifurcated at its forward end to embrace the flattened part of the pin 250. The tension of these springs is exerted upward and they tend to hold the pin in the position shown in Fig. 28 but in case the levers 248 are forced upward a little higher than the stop carriers 154 can go, these springs are adapted to yield to prevent straining of the parts. It will be perceived that if the two levers 248 be elevated to the position shown in dotted lines in Fig. 28, the bar 246 will first operate on any of the feet 183 that may occupy the position shown in Fig. 5 and rock the levers 180, 182 back to the position shown in Fig. 4, thus restoring the universal bars 175 to normal position and with them restoring the operated key-controlled stops. As the bar 246 continues its upward motion it encounters the under side of any stop carrier 154 that may have dropped down to transfer, and raises said stop carrier to normal position. When the stop carrier is raised from the position shown in Fig. 5 to that shown in Fig. 4, the lever 204 by its own weight remains in contact with the base plate 100 and the lever 210 snaps back into the notch 208 under the impulse of its spring 212, thus locking the transfer mechanism in its normal position and retaining the stop carrier in its normal elevated position. In order to insure positively that the levers 204 are properly reset when the plates 154 are elevated, the fingers 249 (Figs. 4 and 5) of the comb-plate 201, are bent downward to a suitable extent so as to lie over the tops of the levers 204. If any of said levers sticks, it strikes the finger 249, which forces the lever to assume its proper position shown in Fig. 4.

Each of the levers 248 has its forward end formed with a succession of steps 255 which engage like steps on a block 256 which is secured by a screw 257 to one of the posts 107 on the shaft 105. The steps 255 give a smooth motion to the levers 248 like that of gearing, and at the same time they enable the arms 107, 256 to move away from the levers 248 on the forward part of the stroke. The restoring devices just described are shown in their normal positions in Fig. 28. It will be perceived that when the shaft 105 makes its forward stroke the block 256 moves downward and forward away from the lever 248 and that during the last part of the return stroke of the shaft the lever will be lifted to the broken line position of Fig. 28 and that when the handle is released and it moves upward to its normal position, the shaft 105, the block 256 and the lever 248 will drop back to the full line positions in Fig. 28. It is partly in order to allow these parts to drop back in this manner that the lost motion is provided between the shafts 105 and 102. It will be understood that it is essential that the bar 246 normally occupies this depressed position as otherwise it would prevent the operation of the key-controlled stops.

The computing mechanism thus far described may be connected up with any suitable system of keys for operating the digit stops 161–169; but I prefer to operate said stops by a single group of digit keys common to all denominations. Said computing mechanism may be thus controlled whether it is or is not connected with a typewriting machine. In combined typewriting and computing machines as heretofore constructed or suggested, the computing mechanism is in some instances controlled by a special set of numeral keys, which numeral keys are operatively connected with the computing mechanism and are also operatively connected with the numeral keys of the typewriting machine. In other prior combined machines the computing mechanism is controlled by the ordinary numeral keys of the typewriter. It will of course be understood that my computing mechanism is capable of being connected with the typewriter in either of these two ways, but in the present instance I have shown the computing mechanism controlled by the ordinary numeral keys of the typewriting machine.

The typewriter keys operate on the adding mechanism through a series of nine nested oscillatory frames, best shown in Figs. 1, 2, 4 and 15. These frames are mounted on a transverse horizontal plate 258, the middle portion of which is cut away for the sake of lightness, as indicated in Figs. 2 and 4. This plate rests at its ends on the flat tops of horizontal flanges 260 of two brackets 261 and 262 arranged at the right and left-hand sides respectively of the computing machine back of the stop carriers 154, and said brackets have lower flanges 263 which are secured by screws 264 to the base plate 100, these brackets as shown in the present instance standing at the extreme rear of the base plate. For reasons which will hereinafter appear, the plate 258 is not rigidly mounted on the flanges 260 but is arranged to be slid a short distance transversely of the machine on said flanges. To this end each of the flanges is formed with an elongated closed slot 265 through which there passes a shouldered and headed screw 266 threaded into the plate 258 and having its head beneath the flange 260. These screws prevent the plate 258 from being lifted off of the brackets and from being moved in front and back direction, but allow to the plate a motion in a right and left-hand direction. Near each end thereof the plate 258 has rigidly mounted therein a fore and aft extending bar 267 having a series of nine slots 268 formed in its upper edge and closed by a cover plate 269 secured in position by screws 270. These slots serve as bearings for nine rock shafts 271, 272, 273, 274, 275, 276, 277, 278 and 279. For convenience of reference I have numbered these shafts not in the order in which they lie in the frame but so that the last digit of each reference numeral will be the same as the numeral on the key to which the corresponding rock shaft is connected when the machine is set for addition. By reference to Fig. 2 it will be seen that the rock shafts 271–279 are progressively longer from the front to the back of the machine. Each of said rock shafts has rigidly secured to its ends the forwardly extending arms 280 of a series of nested yoke frames having transverse horizontal yoke bars 281–289 which yoke bars are connected with the shafts 271–279 respectively, one yoke bar being mounted on each shaft. The yoke frames are normally held up by a series of wire springs 290 which at their rear ends are secured by screws 291 to plates 292 which in turn are secured as by screws to the plate 258 and the bars 267. Each of the springs 290 extends forward and at its front end is hooked at 293 (Fig. 1) under one of the arms 280. In order to keep these springs from interfering with one another they are mounted in two sets, one set at either side of the machine and the springs of each set coöperate with alternate arms 280, the intermediate yoke-frames being controlled by springs at the other end of the system. The motion of the yoke-frames under the impulse of the springs 290 is limited by a bracket 294 secured to the top of one of the cover strips 269 by one of the screws 270 and extending forward over the yoke-bars. The yoke-bars 281–289 have projecting from their upper edges tongues 295, best shown in Fig. 15, and these tongues when the machine is in operation are adapted to be struck to depress the yoke-frames. The tongues 295 are operated on by the lower edges of clips 296, one of which is detachably secured to the under side of each of the numeral key levers 36, one of these clips being shown in detail in Fig. 26. As shown in Fig. 1 the forward ends of the key levers 36 of the typewriter illustrated, are of peculiar outline, each having a depending portion 297. The clip 296 lies beneath this depending portion and it has two upstanding arms 298 and 299 which stand respectively in front of and behind the depending portion 297 of the key lever. The clip has two spring arms or tongues 300 and 301 riveted to its opposite sides and the spring arm 301 at its upper end is bent toward the arm 300, this bent part of the arm 301 comprising a short lug or finger 302 which is adapted to spring over the upper edge of the key lever to prevent the clip from falling off of the key lever. The two springs 300 and 301 press tightly against the sides of the key lever and retain the clip in place with sufficient rigidity but said clip may be readily pulled off of the key lever by forcing the two springs apart. It will be seen that these clips are very readily attachable to and detachable from the key levers. The construction is such that if when the computing machine is in operation one of the numeral keys be depressed, the clip 296 will strike one of the tongues 295 and depress one of the yoke-bars 281–289.

The devices which communicate the motion of the yoke-bars 281–289 to the stops 161–169, are mounted on a denomination selecting carriage 303 arranged to have a step-by-step motion across the rear ends of the stop carriers 154, to bring said devices into coöperation with the stops of one denomination after another, said motion communicating devices sliding beneath the yoke-bars 281-289 lengthwise of said yoke-bars. This carriage is shown in Figs. 1, 2, 4, 6 and 15. The carriage travels on two stationary rails 304 and 305 (Fig. 2) which rest on the base plate 100 to which said rails are secured by screws 306. As indicated in Fig. 4 the base plate 100 is cut away at the back as far forward as the forward rail 304, the rear part of said base plate consisting only of two rearward extensions which support the rails 304 and 305 and the brackets 261 and 262 and certain other devices. Each of the rails 304 and 305 has a rounded flange 307 and the carriage is supported on three grooved rollers 308, the grooves of the rollers engaging the rounded flanges 307 of the rails. As indicated in Figs. 2 and 4 these three rollers are not in alinement but the two end rollers 308 engage the forward rail 304 but do not quite reach back to the rear rail and said rear rail 305 is engaged by the middle roller, thus giving a three-point support for the carriage. The forward rail 304 is formed with slots 309 for the screws 306, said slots affording an adjustment of this rail toward or from the rear rail. In order to make the carriage run very easily the rollers 308 are provided with ball bearings and to this end each of said rolls is formed with an internal V-groove in which run anti-friction balls 310 which engage an upper cone 311 and a lower cone 132. This ball bearing may be made in any suitable way but as here shown the upper cone 311 is formed on a post which depends from the carriage 303 and said post has a threaded part 313 on to which the lower cone 312 is screwed, the construction being such that the bearing may be adjusted by screwing the cone 312 up or down on the threaded portion 313. The coned post 311 has a longitudinal central hole through which passes a headed screw 314 which is threaded into the carriage 303 and holds the post 311 rigidly in position. The head of the screw 314 also bears against the lower cone 312 and prevents said cone from turning on the screw 313, thus maintaining the adjustment of the bearing. Two brackets 315 are secured to the carriage by screws 316 and these brackets extend forward and upward and at their upper and forward ends they are rigidly connected together by a cross piece 317 secured to the brackets by screws 318. The motion transmitting levers or bell-cranks 320 are pivoted on a rod 321 that connects the upper ends of the brackets 315. In order to provide wide pivotal bearings for these levers each one is made in a sort of U-shape and the levers are nested one within the other. In Fig. 6 I have shown the innermost one and the outermost one of these levers. All of the levers except the innermost one are alike except in size. Each one of them is made of a piece of sheet metal stamped out and bent up in the form shown comprising side pieces 322 which are connected together at the bottom by a cross strip 323. Each of said side pieces has an arm 324 with a hole 325 therein which receives the pivot rod 321. From the rear of each of the side pieces 322 there rises an arm 326 having an upper edge 327 that slides beneath the appropriate one of the yoke-bars 281-289. In order to prevent any one of the levers from becoming displaced from its appropriate yoke-bar, each of the arms 326 has a finger 328 projecting upward therefrom, the several fingers 328 standing between the yoke-bars 281-289 as indicated in Fig. 4. Each of the cross pieces 323 has projecting therefrom toward the front of the machine a tongue 330 which, when the carriage is in position for setting up a number in any denomination, stands immediately behind the rear end of the appropriate one of the stop wires 161-169, as will be understood by reference to Fig. 4. The innermost one of the levers 320 is formed of a broader piece of metal, as shown in Fig. 6, having simply a depending arm 331 with a tongue or finger 332 projecting therefrom toward the front of the machine and a rearwardly extending arm 333 having in its upper edge a deep notch 334 which receives the yoke-bar 285 with which this lever coöperates. The levers 320 are maintained in their normal positions with their rear arms held up against the yoke-bars and with their depending arms held back out of contact with the stop wires by a series of contractile springs 335, each of which is connected at its forward end with one of the cross pieces 323 and at its rear end to a post 336 (Figs. 4 and 15) which is secured to the carriage 303 by a screw 337. In order to avoid crowding, the springs 335 are arranged in the staggered fashion shown in Fig. 15.
The motion of the levers 320 under the impulse of the springs 335 is limited by the engagement of the arms 324 of said levers with the cross bar 317 as will be understood by reference to Fig. 4. It will be seen that when the carriage 303 is in any denominational position the levers 320 connect the numeral keys of the typewriter with the computing machine stop wires in such fashion that if any of said keys be depressed the appropriate stop wire will be thrust forward to operative position. When the typewriter carriage is out of the adding column, however, the computer carriage stands in the position shown in Fig. 2 in which position the tongues 330 are at the left of the extreme left-hand one of the stop carriers 154 so that if the numeral keys be depressed at such a time the levers 320 will be operated, ordinarily, but no stop wires will be set by said levers.

The motion of the carriage 303 is limited by stops 338, one at each end of the carriage run. In the present instance these stops are shown as formed by screws 339 with a surrounding sleeve of some soft material such as felt or leather. The screws 339 are threaded into the upper side of the rear rail 305.

The carriage 303 may be stepped across the series of stop carriers 154 by any suitable means, but I prefer to connect said carriage with the carriage of the typewriting machine. As best shown in Figs. 1, 2 and 24 a vertical rock shaft 340 is journaled in the rear part of the casing of the computing machine. The upper part of this shaft is journaled in a hole 342 (Fig. 24) in the shelf 96 of said casing and the lower reduced end 343 of the shaft is stepped in a thrust bearing 344 secured to a bottom plate 345 which extends across the rear end of the casing. The shaft 341 has a long arm 346 extending therefrom horizontally toward the front of the machine, said arm, as shown in the present instance, having a reduced rear end 347 which passes through the shaft 341 and is secured in place by a nut 348 threaded on to the rear end thereof. At its forward end the arm 346 is connected with the carriage 303 by a link 350 which is pivoted to the carriage at 349. As shown in the present instance this link is made up of two parts as will be best understood by reference to Figs. 2 and 4, namely, the wire link proper 350 which is pivoted at its right-hand end to the arm 346, and a forwardly extending block portion 352 into which the wire 350 is threaded. As shown in Fig. 4 the forward end of the block 352 is bifurcated to embrace the plate-like body of the carriage 303 and the pivot pin 351 passes through the arms of this bifurcated block 352 and through the carriage plate. The construction is such that the carriage 303 may be moved back and forth along the rails 304 and 305 by rocking the shaft 341.

As shown in Figs. 1, 17 and 18 a vertically elongated support 353 is secured to the back plate 3 of the typewriter frame in any suitable manner, as for example, by bolts 354. The support 353 has bent out from its upper and lower ends respectively, rearward projecting brackets 355 and 356 in which there is journaled a vertical rock shaft 357. As shown in Fig. 2 the shaft 341 has a socket 358 in its upper end and as shown in Figs. 1 and 38 the lower end of the shaft 357 is stepped in this socket when the typewriting machine is in place on the computing machine, but said shaft 357 may readily be lifted out of the socket when the typewriter is lifted off of the computing machine. In order to cause the shafts 357 and 341 to act in unison as a single shaft a longitudinal transverse slot 360 (Fig. 38) is cut across the upper end of the shaft 341 and a pin 361 passing through the shaft 357 is adapted to enter this slot and to constrain the two shafts to turn in unison. In order to connect the shafts together still more rigidly a screw 362 is threaded through one side of the shaft 341 in position to act as a set screw against the shaft 357. The screw 362 is shown provided with a handle 363 for convenience in tightening and loosening the screw. When the two machines are in use in combination it is contemplated that the screw 362 shall be tightened. Above the bracket 355 the shaft 357 is enlarged as shown in Fig. 18 to form a shoulder which rests on the bracket and prevents the shaft from dropping downward endwise. Said shaft at its upper end terminates on a level with the tabulator stop bar 66 where said shaft has projecting therefrom in a direction approximately parallel with the direction of travel of the typewriter carriage, an arm 364 having on its free end an anti-friction roller 365 which is journaled on a pivot screw 366 threaded into the arm 364. As shown in the present instance the arm 364 projects toward the left from the shaft 357.

The roller 365, is a follower which coöperates with a cam mounted on the tabulator stop bar 66 of the typewriter. I have shown three forms of cam for this purpose. one in Figs. 17 and 23, another in Figs. 19 and 20 and a third in Figs. 21 and 22. In the form shown in Figs. 17 and 23 there is a block or body piece 367, the forward end of which lies over the bar 66 and which in its rear part is cut away as indicated at 368, this cut-away being chiefly for the sake of lightness. The block is also cut away on its under side as indicated at 369 to afford a passage for the roller 365. A plate 370 of sheet metal is secured to the under side of the block 367 by rivets 371 and said plate has two ears 372 bent downward therefrom and said ears are bifurcated to embrace the bar 66 in the same manner as the column stops 70. The block is set on to the bar by pushing it on from the rear, the two ears 372 entering the slots 68 in the upper and lower surfaces of the bar. In order to secure the cam or controller more rigidly on the bar a set screw 373 may be provided, said set screw being threaded through the controller and adapted at its lower end to engage the bar 66. The rear edge of the plate 370 is formed with inclined portions 374 and with dwells 375. The inclined parts 374 are placed at such an inclination that when the typewriter carriage steps a letter space distance to the left the incline will permit the roller 365 to move toward the front of the machine to such an extent as to move the computer carriage 303 from right to left from one denominational position to the next. It will be perceived that the construction is such as to cause the computer carriage to move in a direction the opposite of that in which the typewriter carriage moves. The computer carriage is propelled by a spring 376 (Figs. 1 and 2) mounted in the computer casing and connected at one end to the arm 346 and at the other end to a lug 377 projecting inward from the right-hand side plate 90. The dwells 375 are spaced such a distance apart that the roller 365 moves from one dwell to the next in three letter space steps of the typewriter carriage and each of said dwells is of such a length as then to permit the typewriter carriage to move one letter space distance without moving the computer carriage. It will be seen that these dwells are so disposed as to permit of writing punctuation points in every fourth letter space position in the adding column while maintaining the computer carriage stationary at those points. The extreme rear left-hand part of the plate 370 is formed into a sort of dwell 378 against which the roller 365 is adapted to rest just prior to the first letter space position in the adding column.

The arm 364 normally stands in the position shown in Fig. 17 in which position it is maintained against the tension of the spring 376 by means of a detent 380 consisting of an arm pivoted to the arm 364 and projecting therefrom at an inclination toward the front of the machine and at its free end engaging a lug 381 projecting upward from the top plate 4 of the typewriter. I have provided means for tripping this detent whenever the typewriter carriage comes into the adding column. As shown in Fig. 18 the arm 380 projects from a hub 382 which is secured on a short vertical rock shaft 383 extending upward through and pivoted in the arm 364. At its upper end the rock shaft 383 has mounted thereon and extending toward the rear of the machine therefrom an arm 384. A second arm 385, parallel to the arm 384, is mounted on the upper end of a pivot pin 386 which passes through and is pivoted in the arm 364 and is held against withdrawal from said arm by nuts 387 threaded on to the lower end of the pivot pin. A horizontally disposed plate 388 is pivoted to the arms 384 and 385 by means of pivot screws 390. A spring 391 is connected at one end to a screw 392 threaded into the arm 364 and at its other end to a screw or pin 393 projecting toward the rear of the machine from the hub 382, the tension of this spring being exerted to throw the free end of the arm 380 toward the operator's left or toward the right as seen in Fig. 17. The motion of the parts under the impulse of this spring is limited by the heads of the screws 390 contacting with the rear face of the arm 364. The plate 388 is formed on its rear edge with ratchet teeth 394 spaced a letter space distance apart, and these ratchet teeth are adapted to be engaged by a pawl or hook 395 which is pivoted to the under side of the rear end of the block 367 by means of a pivot screw 396. A spring 397, secured to said plate 367, normally holds the pawl 395 in position for its right-hand end to engage the ratchet teeth 394, the motion of the pawl under the impulse of the spring being limited by a stop pin 398.

The construction is such that if the typewriter carriage moves into the adding column from the left the point of the pawl 395 will engage the first one of the ratchet teeth 394 and move the plate 388 toward the left, thus swinging the arm 380 away from the lug 381 and permitting the arm 364 to move toward the front of the machine under the impulse of the spring 376. It may happen, however, that the typewriter carriage will not be moved into the adding column from the left but in case there is nothing to be written on the paper at the left of the adding column and in case the number to be written in the adding column is small, the typewriter carriage may be moved into the adding column from the right and may be stopped before it reaches the denominational position in Fig. 17. The escapement mechanism of a typewriter is so constructed that when the carriage is moved toward the right and is released it moves a fraction of a letter space distance toward the left under the impulse of its driving spring before the lost motion in the escapement mechanism and its connections with the carriage is taken up. In case the typewriter carriage moves into the column from the right, the pawl 395 will snap over the several ratchet teeth 394 until the carriage is stopped, whereupon this short leftward movement of the typewriter carriage will be sufficient to cause the pawl 395 to engage whichever ratchet tooth 394 it happens to be next to and impart the necessary motion to the plate 388 and through it to the detent 380, so that the arm 364 will be released in whatever position the carriage may be stopped. It will, of course, be understood that if the carriage is brought into the adding column in this manner the arm 364 will move at once toward the front of the machine until it strikes the part of the cam appropriate to the particular denominational position in which the carriage is arrested and that the computer carriage will thus be brought into the corresponding denominational position.

The computer carriage is restored to its normal position, shown in Fig. 2, by the operating mechanism during the last part of the return stroke of the operating handle, by means best shown in Figs. 1, 2 and 24. As best shown in Fig. 2 the rock shaft 341 has an arm 400 projecting therefrom toward the left. This arm, as shown in the present instance, consists of a piece of sheet metal secured to the arm 346 by means of rivets 401. A push link 402 is pivoted to the free end of the arm 400 and extends toward the front of the machine, being pivoted at its forward end on a pivot screw 403 threaded into an arm or lever 404 which is loosely mounted on the operating shaft 222 at the left-hand side of the gear segment 223. Motion of this lever arm toward the right is prevented by said gear segment and motion thereof toward the left is prevented by a collar 405 mounted on the shaft 222 and secured in position by a set screw. It will be understood that the lever arm 404 is loosely mounted on the shaft so that the shaft and arm are free to move independently of each other. The arm 404 has a lug or pin 406 projecting therefrom toward the right and behind the rear edge of the gear segment 223. The construction is such that if the computer carriage stands at the right-hand end of its run then, when the operating handle is operated, in the last part of the return stroke of said handle, the gear segment 223 contacts with the pin 406 and forces the lever arm 404, the link 402 and the arm 400 toward the rear of the machine, thus rocking the shaft 341 and the parts connected therewith, moving the computer carriage to its extreme left-hand position and moving the arm 364 to its extreme rear position where it is caught by the detent 380, snapping in behind the lug 381.

As has been explained hereinbefore, when the handle 220 is pushed back to the extreme limit of its motion and is released, it immediately rises to the position shown in Fig. 25. This forward motion of the handle moves the rear edge of the gear segment 223 away from the lug 406 as indicated in Fig. 24, thus leaving the computer carriage free to move toward the right as far as the operating mechanism is concerned. The motion of the computer carriage toward the right, of course, moves the lug 406 toward the front of the machine. This is an additional reason why it is important to move the handle 221 up to the position shown in Fig. 25 after it has been operated and released.

In the form of carriage controller shown in Figs. 17 and 23 the computer carriage is propelled by the spring 376 in one direction and is restored by the operating mechanism. In the forms of controller shown in Figs. 19 to 22 the computer carriage is positively propelled by the typewriter carriage in both directions. In Figs. 19 and 20 the controller comprises a block 407 having on its under side an inclined cut-out 408. A plate 410 is secured to the under side of the block 407 and has depending therefrom ears 411 like the ears 372 of Fig. 23 and the rear edge of the plate 410 is made in the form of a cam which, as shown in Fig. 19, is formed with dwells three letter space distances apart and as shown in Fig. 21 is formed smooth so as not to provide for any punctuation. A second plate 412 is secured to the under side of the extreme rear part of the block 407 and said plate 412 has its forward edge formed to constitute a cam for coöperation with the roller 365. In both of these forms of controller a groove is left between the rear edge of the plate 410 and the forward edge of the plate 412, which groove is of such width as just to permit the roller 365 to pass between the two plates. It will be seen that in these forms of controller the arm 364, and with it the computer carriage, are positively moved in both directions by the typewriter carriage and that in the form shown in Figs. 19 and 20 provision is made for punctuation points, whereas in the form shown in Figs. 21 and 22 no such provision is made, this form of controller being adapted for use when the numbers are written solid without commas or decimal points. These forms of controller may be provided with a set screw like the set screw 373 if desired. When a controller of this sort is used it will be seen that two controllers may be provided and as they are readily detachable from and attachable to the machine, one of them may be put on when it is desired to punctuate the numbers and the other when it is desired to write the numbers solid.

When carriage controllers of the form shown in Figs. 19 and 21 are employed the detent 380 and the parts for controlling the same are omitted as are also the spring 376, the push link 402 and the lever arm 404 so that the computer carriage is not restored to normal position by the operating handle, but is positively moved by the typewriter carriage in both directions. The computer carriage, when the controller cams move away from the roller 365 in either direction, will be standing at one or the other of the extreme limits of its motion and will continue to stand there until moved away by the cam. If desired, any suitable form of yielding detent or retaining device may be employed to prevent accidental displacement of the computer carriage when it is out of the control of the typewriter carriage.

The controller cam shown in Fig. 17 is formed with dwells for punctuation points. I contemplate equipping each machine with two cams of the sort shown in this figure, one of them being formed with the dwells as shown and the other formed smooth like the cam edge of the plate 410 in Fig. 21, so that if the operator is writing punctuated numbers he will use the controller shown and if writing numbers solid he will use the other controller. It will, of course, be understood that controllers may be formed for other styles of punctuation than that indicated. The controllers shown in Figs. 17 and 19 are arranged to provide for a comma between the thousands and hundreds columns and for a decimal point for writing in United States money, the cam allowing two steps of the carriage after passing the last dwell and a third step which carries the computer carriage entirely to the right of the stop carrier 154 of lowest denomination. It will likewise be observed that both forms of controller shown are adjustable to any desired position on the column stop bar 66 so that the adding column may be located anywhere in the line of writing. When one of the controllers is thus adjusted to locate the adding column one of the column stops 70 will be adjusted in a definite relation to the controller so as to cause the tabulator to arrest the carriage at denominational positions within said adding column. In other words, the column stop 70 is so adjusted with relation to the controller as to cause the computing mechanism and the tabulating mechanism to work in harmony. It will also be noted that with both forms of controller the carriage is entirely free, so far as the computing mechanism is concerned, to move back and forth either at the left-hand side of the adding column or at the right-hand side of the adding column. After the controller has passed the follower 365 the typewriter carriage can move on beyond the adding column as far as its own mechanism will permit without interference by the computing mechanism and without the computing mechanism itself being in any wise affected thereby. The mater which may thus be writen beyond the adding column may contain numerals as well as other characters and the printing of said numerals will not affect the computing machine because the computer carriage will not be in register with any of the stop supports 154.

I have provided an indicating device to indicate at all times the location of the computer carriage, this device being best shown in Figs. 1, 2, 3 and 4. The register is provided with a casing comprising side plates 413 secured by screws 414 to the forwardly projecting part of the base plate 100. The left-hand one of the side plates 413 has a hole through which the shaft 102 passes. The register casing also includes a curved front and top plate 415, the lower part of which is secured by screws to the front of the base plate 100 and the right and left-hand edges of which are secured to the side plates 413 by screws 416 threaded into blocks or lugs 417 (Fig. 4) riveted to the inside of the side plates 413. The cover plate 415 has a sight opening 418 in position to show one row of numerals near the tops of the several register wheels, this opening being so disposed that when the register wheels are in normal position a row of zeros is visible through it. A pointer arm 420 is secured to the cross bar 317 of the computer carriage and extends forward over the tops of the stop supports 154 and over the register wheels and the forward end 421 of this pointer arm is bent out through the sight opening 418 and is bent back toward the rear of the machine in position to register with the indications on a scale plate 422 mounted on the cover plate 415. This pointer is shown in normal position in Fig. 2 and as the carriage moves from left to right it steps along therewith, pointing in each position to the indications on the scale plate. It will be noted that this pointer is not set directly over any register wheel but that it occupies in its several steps positions intermediate the register wheels. The pointer is arranged in this fashion so as to avoid obscuring the numerals on the wheels.

As has been explained above I contemplate having two carriage controllers, one arranged for punctuation appropriate for writing United States money and the other for writing solid numbers without a decimal point. The change from one of these controllers to the other would involve a change in the denominational values of the several wheels and in order to change the indications of the indicator correspondingly, I make the scale plate 422 slidable longitudinally to a limited extent. To this end said scale plate is mounted loosely on the cover plate 415 and is retained in position by two straps 423, one at each end of the scale plate, the construction being such that the scale plate can slide through the straps. Said scale plate is provided with a finger button 424 consisting of the head of a pin which is riveted into the plate and projects beneath the plate into a slot 426 shown in dotted lines in Figs. 2 and 3. The pin is slidable in the slot and its motion is limited by the ends of the slot. When the pin stands in the left-hand end of the slot, as shown in Fig. 2, the tens of cents and cents indications are visible at the right-hand end of the scale plate and the two highest designations are hidden, but when the pin is moved to the right-hand end of the slot, as shown in Fig. 3, the tens of millions and millions indications are exposed and the decimal indications are concealed beneath the right strap 423. The scale plate is set as shown in Fig. 2 when a controller is used having the dwells in the cam as shown in Figs. 17 and 19, and the scale plate is set in the position shown in Fig. 3 when a smooth cam is used such as that shown in Fig. 21.

In order to prevent the operator from forgetting to work the operating handle after each number has been written, I provide means for locking the computer carriage against return motion after it has entered the adding column, this lock being released by the operating handle and being thrown into locking position again by depression of a numeral key. As best shown in Figs. 15 and 16 the rear carriage rail 305 has a rack bar 425 pivoted thereto at its right-hand end on a pivot screw 426. At its left-hand end the bar 425 is formed with a vertically elongated slot 427 through which there passes loosely a shouldered and headed screw 428 which is threaded into the rail 305, the construction being such as to permit of the left-hand end of the rack bar having a slight up and down motion about its pivot 426. At its left-hand part the upper edge of this rack bar is formed with ratchet teeth 430 having their abrupt faces toward the right and spaced a distance apart equal to the spacing of the stop carriers 154 and of the register wheels. These ratchet teeth are adapted to coöperate with the point of a pawl 431 which is pivoted on a pivot screw 432 threaded into a bracket 433 (Fig. 4) depending from the carriage 303. The pawl 431 is provided with a spring 434 which is secured to the carriage 303 by a screw 435 and tends to press the point of the pawl downward, the motion of the pawl under the impulse of the spring being limited by a tail 436 of the pawl contacting with the under side of the carriage. When the computing machine parts are in position to have a number set up thereon, the rack bar 425 occupies its upper position shown in Fig. 16 in which position it is held by a flat spring 437 secured to the under side of the rail 305 by a screw 438, the free end of the spring pressing against the pin 439 depending from the bar 425. When the bar 425 is in this position it will be seen that the carriage 303 is free to move toward the operator's right but it cannot be moved in return direction until the bar 425 is moved to its depressed position shown in Fig. 15 where the ratchet teeth 430 are below the path of movement of the pawl. This pawl and ratchet device has another function, namely, that when the carriage moves toward the right the pawl, snapping behind the teeth of the ratchet, prevents rebound of the carriage, which rebound might occur at the instant the key was depressed and might prevent the tongues 330 from operating the stops. The bar 425 is depressed and is latched in depressed position by a bell crank lever 441 which is pivoted on a screw 442 threaded into a bracket 443 secured to the under side of the horizontal flange 260 of the bracket 262 which supports the key-operated yoke-frames. The depending arm of the bell crank 441 is formed near its lower end with a bevel 444 which, when the bar 425 is in its elevated position, shown in Fig. 16, is adapted to operate on a lug 445 projecting from the rear face of the rack bar so that if said depending arm be moved toward the left, or toward the right in Fig. 16, the bevel, acting on the lug, will depress the rack bar. Said depending arm of the bell crank is also formed with a retaining edge 446 which, when said depending arm is moved toward the left, moves over the top of the lug 445 and retains the rack bar in its depressed position. The lever arm is also provided with a stop finger 447 which, contacting with the lug 445, limits the leftward motion of said lever. The bell crank 441 is moved from the position shown in Fig. 16 to that shown in Fig. 15 by the operating handle through the instrumentality of a rock shaft 448 (Fig. 2) which extends fore and aft of the machine at the left-hand side thereof and is journaled in bearings 450 (Fig. 2) and 451 (Fig. 16) secured by screws to the base plate 100. The rock shaft 448 at its rear end is bent toward the right as shown in Figs. 2 and 16, forming a crank arm 452 which lies just back of the rear rail 305. The crank arm 452 is bent upward forming an upstanding arm 453 which at its upper end is bent toward the rear of the machine as shown at 454, the rearwardly extending part 454 lying beneath the horizontal arm of the bell crank 441. At its forward end the rock shaft 448 is bent toward the right, forming an arm 455 which normally lies just in front of the stop bracket 243, as will be understood by reference to Figs. 2 and 24, in position to be engaged by a notch 456 in the rear edge of the gear segment 223 when said gear segment is moved to its extreme rear position by the forward motion of the operating handle. The gear segment engaging the arm 455 lifts the same and rocks the shaft 448 and elevates the horizontal arm of the bell crank 441, as indicated by dotted lines in Fig. 15, thus depressing the rack bar 425 and locking it in its depressed position. As soon as the operating handle is pushed toward the rear the crank 454 drops back to the full line position of Fig. 15, leaving the rack bar locked in its depressed position. Said rack bar is released and permitted to rise to its upper position under the impulse of its spring 437 by the depression of any numeral key. To this end the horizontal arm of the bell crank 441 has an extension 457 which underlies all of the left-hand arms 280 of the key-operated yoke frames so that whenever any numeral key is depressed said universal bar will be depressed and will release the rack bar. It may sometimes happen that in order to make corrections the operator wishes to move the carriage backward without operating the handle 220. In order to make this possible the bar 457 is prolonged, its extreme end projecting through a slot 458 (Fig. 25) in the left-hand casing plate 90 so that the bar may be elevated by hand if desired. This detracts nothing from the value of these parts as a reminder to the operator to work the handle before withdrawing the carriage. It is not the purpose of these devices to make it impossible to withdraw the carriage without operating the handle but only to prevent the operator from forgetting to operate the handle.

Corrections can be made by means of the mechanism which has been described in case the operator has struck the wrong numeral keys and set up the wrong number in the computing mechanism. In order to do this the operator would first raise the handle 457 (Fig. 16), thus camming the ratchet bar 425 down to a position which will permit of the computer carriage being returned to initial position. He would then snap the pawl 235 (Fig. 25) by hand so as to permit the handle 220 to be pushed toward the rear of the machine. This handle will then be pushed back as far as it will go and released. This motion of the handle restores the computer carriage to initial position by the means which have been described for that purpose and also elevates the bar 246 (Fig. 28) and re-sets to normal position all of the key controlled stops. The backward motion thus imparted to the handle is just enough to take up the lost motion between the shafts 105 and 102 so that the register wheels are not disturbed. When the handle is released it automatically returns to its normal position shown in Fig. 25. The number erroneously written on the typewriter is erased and the entire number rewritten correctly. It will be seen that corrections are made by a partial reverse operation of the operating handle.

The computing machine is capable of performing the operations of addition, subtraction, multiplication and division. In this machine a number is subtracted by adding its complement and multiplication and division are performed by repeated additions or subtractions. I have provided means whereby when it is desired to perform subtraction or division the machine may be so set by pressing suitable keys that when a number is written by striking the numeral keys of the typewriter the computing machine will be set to add the complement of that number. It has been explained above that the frame 258 (Fig. 15) is capable of being slid transversely of the machine. The tongues 295 are so arranged that when this frame is in one position any given numeral key will depress that one of the oscillatory yoke frames which corresponds to the numeral on the key, and when the frame 258 is in another position the same key will depress the yoke-frame which corresponds to the complement of the numeral on the key. In order to make this more readily understood, in Fig. 15 I have imprinted on each of the tongues 295 the digit that this particular tongue is adapted to add or subtract, as the case may be. In said Fig. 15 the frame is set for addition. This frame also has an intermediate position in which the clips 296 come down between the tongues 295 without operating any of them and in this intermediate position, of course, the numeral keys do not set any stops in the computing mechanism. The three positions of the frame 258 are indicated diagrammatically in Figs. 35, 36 and 37, Fig. 25 showing the parts set for addition, Fig. 36 showing the parts in inoperative position and Fig 37 showing the parts set for subtraction. In these figures the clips 296 are indicated by heavy up and down lines, the nested yoke frames by light lines and the tongues 295 by heavier sections of said light lines. In Fig. 35 the keys for the digits "1," "2," "3," "4," "5," "6," "7," "8," "9" are respectively connected with the yoke-bars 281, 282, 283, 284, 285, 286, 287, 288 and 289 which in turn are respectively adapted to operate the stops 261–269. In this figure the "0" key is not adapted to operate any yoke frame. In Fig. 37 the "1," "2," "3," "4," "5," "6," "7," "8" and "0" keys are respectively connected with yoke bars 288, 287, 286, 285, 284, 283, 282, 281, 289 so that the "1" key is adapted to set the "8" stop, the "2" key, the "7" stop and so on, each key being adapted to set the stop appropriate to the difference between nine and the numerical value of that key. In this position of the parts the "9" key does not operate any stop but does, of course, print its numeral on the paper, whereas the "0" key operates the "9" stop. A spring 460 (Fig. 15) is connected at one end to a pin 461 on the bracket 261 and at the other end to a pin 462 depending from the plate 258 and said spring tends to draw said plate toward the right into the subtracting position shown in Fig. 37. The plate is moved toward the left to the position shown in Fig. 36 to disconnect the numeral keys and still farther toward the left to the position shown in Fig. 35 for the purpose of addition, by means of certain keys presently to be described, which keys act on a horizontal rock shaft 463 which is journaled at its rear end in a bracket 464 secured to the base plate 100 by a screw 465 and at its forward end (Fig. 1) in a bracket 466 similar to the bracket 464. At its rear end the shaft 463 has rigidly mounted thereon an upstanding arm 467 which is connected by a link 468 to a bracket 469 rising from the frame 258, the link 468 being pivoted at its ends on pivot screws 470. Near its forward end the rock shaft 463 has an arm 471 projecting therefrom toward the left, said arm, as shown in the present instance, consisting of a flat piece of metal secured to the shaft by rivets 472.

Above the arm 471 and at the right of the system of stop supports 154 there is mounted (Fig. 31) a set of five key levers 473, 474, 475, 476, 477, said key levers having on their forward ends keys 478 marked with signs to indicate subtraction, addition, zero, division and multiplication, respectively. These keys are adapted to set the machine for different arithmetical operations, or to disconnect the computing mechanism from the numeral keys. These key levers, as best shown in Figs. 1 and 31, are pivoted intermediate their ends on a rod 480 which is mounted at its ends in bracket arms 481 bent up from the ends of a plate 482 which is secured to the base plate 100 by screws. The key levers are spaced apart on the rod 480 by collars or sleeves 483 and they are provided back of their pivots with returning springs 484 each connected at one end to one of the key levers and at its lower end to the plate 482. A retaining plate 485 is arranged at the rear ends of the key levers and is pivoted on a rod 486 which passes through the brackets 481, the plate 485 being folded around the rod in the manner indicated in Fig. 31. The forward fold 487 of this plate has its upper edge a short distance in front of the rear fold and below the upper edge 488 of said rear fold, and the rear ends of the several keys normally rest on said forward fold 487. The rear fold of the plate 485 has a forward bend 490 which, when one of the keys is depressed, is cammed toward the rear until the end of the key passes the bend, after which the plate snaps in under the key and retains it in its elevated position. If another key be depressed it will cam the plate 485 toward the rear and release the first key before the plate snaps in under the key lever that is being depressed because the bend 490 extends farther toward the front of the machine than the upper edge 488. The rear ends of the keys which are not depressed press against the upper edge of the fold 487 at an inclination so that said keys tend to cam the plate toward the front of the machine and this plate would perform its function without any other spring control than is afforded by the keys. However, I have provided an additional spring 491 (Fig. 2) to draw the plate toward the front of the machine.

From what has been said it will be understood that the spring 460 (Fig. 15) tends to hold the plate 258 in position for subtraction so that if none of the keys 478 is depressed the machine will operate for subtraction. I prefer, however, to provide the key lever 473 marked for subtraction but this key lever has no other effect upon the mechanism than to throw back the retaining plate 485 and let the other keys stand in their normal positions. The fact that this key is depressed readily indicates to the operator that the machine is set for subtraction. The key lever 474, which is designed to set the machine for addition and the key lever 477, which is designed to set the machine for multiplication, each has depending therefrom an arm 492 which when either of these keys is depressed, strikes the arm 471 and depresses said arm, thus rocking the rock shaft 463 and forcing the plate or frame 258 to its extreme left-hand position against the tension of the spring 460. When one of these keys is depressed it is locked in its depressed position by the plate 485 and the frame is therefore locked in position for addition. When the addition key lever 474 is depressed the mode of operating the machine is that which has been indicated throughout the description. The typewriter is used for whatever matter it is desired to write and when numbers are to be written in the adding column the typewriter carriage is brought into said column to the proper denominational position, the denominational tabulator shown being adapted to facilitate this setting of the carriage. The numeral keys are then struck to write the numbers on the typewriter and after the entire number has been written the handle 220 is operated and any other matter that it is desired to write in the same line, if any, is written and the carriage is drawn back and the platen is line spaced for another line, after which these operations are repeated. When the column of numbers is complete the total will be found indicated on the register wheels and may be copied on to the paper. If it is desired to copy the total without affecting the adding machine the key lever 475 is depressed which automatically releases the adding key lever 474. This key lever 475 has an arm 493 depending therefrom, which arm is similar to the arms 492 except that it is not as long as said arms 492 but is of such a length as to bring the plate or frame 258 to its intermediate position, indicated diagrammatically in Fig. 36 where the clips 296 do not strike any of the tongues 295.

As was said above, the operation of subtraction is performed by adding on the register wheels the complement of the number subtracted. If it is desired to subtract one number from another the addition key lever 474 is depressed and the minuend is written and added on the register. The subtraction key lever 473 is then depressed and the subtrahend is written. In this operation, however, the operator writes the nonsignificant zeros beginning with the highest denomination that the machine is adapted to handle. As has been explained, when the subtraction key is depressed each digit written sets the stops so as to add in that denomination the difference between nine and the written digit. This gives the true complement of a number except in the case of the digit of lowest denomination. In this denomination the number added should be the difference between ten and the written digit and I have provided means for making this difference automatically in the machine. It is for this purpose that the lever 217 (Fig. 32) is pivoted to the stop support 154 of lowest denomination. The arm 471 on the rock shaft 463 terminates adjacent this stop support and when said arm is depressed by the addition key or the multiplication key its free end rests on the arm 218 of the lever 217 as indicated in Fig. 32, and holds the rear end of said lever depressed, thus holding the stop support 154 in its upper position; but when neither of these keys is depressed the arm 471 occupies its upper position and no longer presses down on the lever arm 218. The right-hand stop support therefore drops down in the same manner as the other stop supports do for the purpose of carrying. When the machine is set for subtraction therefore this particular one of the stop supports has its forward end dropped down a unit's distance so that when any key-controlled stop in this support is set it will add one more on the register wheel of lowest denomination than the digital value of the stop would ordinarily be, and even if no one of the stops 161-169 is set but the retaining stop 172 is projected, one will be added on this wheel every time the operating handle is worked. It will thus be seen that when the machine is set for subtraction the digits added on all of the wheels, except that of lowest denomination, is equal to the difference between nine and the digit written in that denomination; but in the case of the wheel of lowest denomination, the digit added will be the difference between ten and the written digit or one more than the complement of the written digit. It will be noted that when the frame 258 is set for subtraction the zero key is arranged to set the nine stop, and it is necessary in order to give the correct result that the nines be added in all of the denominations in which no other digit than zero is written. It is therefore necessary to write the nonsignificant zeros in performing the operations of subtraction and of division.

Multiplication is performed on this machine by repeated addition. In order to effect this operation the multiplication key is provided with means for operating a "repeat" device for throwing out of operation the device for automatically resetting the key-controlled stops 161-169. As has been explained hereinbefore, these stops are reset by the cross bar 246 operating on the feet 183 of the levers 180 and it will be recalled that this cross bar is hung by vertical arms 247 on pivots 251 so that said cross bar is free to be swung toward the rear of the machine. In order to effect multiplication and division I swing this bar toward the rear to a position where, when it is elevated, it does not strike the feet 183 of the levers. As shown in Fig. 30 the bar 246 has a pin 494 projecting from its right-hand end, said pin in the present instance consisting of the head of a screw threaded into the end of the bar or into the arm 247 from which the bar is hung. The pin 494 lies in a slot 495 made in the upturned left-hand end of a horizontal lever 496 which is pivoted on a pivot screw 497 threaded into the base plate 100. The lever 496 has part of its rear edge turned up to form a flange 498. Each of the key levers 476 and 477, these being the multiplication and division key levers respectively, has a depending lever arm 500, the lower end of which, when the key lever is depressed, acts on the flange 498 and presses the lever 496 toward the rear of the machine, thus swinging the bar 246 back to a position where it is inoperative on the feet 183. When one of these key levers is depressed and a number is set up on the setting-up mechanism and the handle 220 is operated, the register wheels are turned and the bar 246 is elevated as before but it does not operate on the feet 183 and therefore does not disturb the setting of the stops. The bar does, however, restore to normal position any of the stop supports 154 which may have been tripped for the purpose of transfer. Incidentally the right-hand stop support 154 is raised if the division key be depressed but it drops back to its lower position again as soon as the handle is released. The act of swinging the bar 246 toward the rear slightly elevates said bar and to compensate for this each of the stop supports 154 has a notch 501 cut in its lower edge in the position occupied by the bar 246 when it is pushed back to its rear position by the multiplication or by the division key. When the multiplication or division key is released the lever 496 is drawn back toward the front of the machine by a spring 502 connected at one end to the lever and at the other end to a pin 503 rising from the base plate 100. The forward motion of the lever is limited by a stop pin 504 which, as here shown, consists of the head of a screw threaded into said base plate 100. If it is desired to multiply a number by seven, for example, the multiplication key will be depressed and the operating handle. will be worked six times, thus adding the number on the register wheels six times. The addition key will then be depressed and the handle will be operated a seventh time. The depression of the addition key releases the multiplication key and permits the bar 246 to swing back under the feet 183 so that when the handle is operated the seventh time the stops will be reset to normal position.

If it is desired to multiply a number by seventy the number is written in one denominational position to the left of that which it would ordinarily occupy so that the number actually written is ten times the number to be multiplied. The number written is then multiplied by seven in the manner above described. If it is desired to multiply a number by seventy-five the number may be written and multiplied by five and then ten times the same number may be written and multiplied by seven. The register wheels will then indicate seventy-five times the number. Division is performed by repeated subtraction in the same manner as in other machines.

In copying a total from the register wheels on to the paper it may sometimes be advantageous instead of depressing the disconnecting key lever 475 to depress the subtraction key and after copying the total to work the operating handle. This operation clears the register and also serves as a check on the accuracy of copying, as, if the total has not been copied correctly the register wheels will not be brought to zero. I have, however, provided a special zero setting key 505 and connections for bringing the register wheel to show a row of zeros at the sight opening. The zero setting mechanism is best shown in Figs. 4, 27 and 29. The zero key 505 is mounted on the upper end of a vertical stem 506 which extends upward through the cover plate 415 at the left-hand end of the register. The lower end of the key stem 506 is pivoted at 507 to a lever 508 which is pivoted between its ends on a pivot screw 510 threaded into the standard 227 which supports the rock shaft 222. At its forward end the lever 508 is bent toward the right forming a lug 511 (Fig. 27) which overlies a flange or projection 512 bent off from the forward end of a lever arm 513 which is pivoted intermediate its end at 514 (Fig. 29) on a screw or pin projecting inward from the left-hand standard 103 in which the hollow shaft 102 is journaled. The lever 513 constitutes one arm of a yoke frame which also comprises a yoke bar 515 which extends across the register beneath the register wheels and which is supported at its right-hand end on a second arm 516 which is pivoted on a pin 517 passing through the right-hand standard 103. The rear edge of the yoke bar 515 is bent upward to form a flange 518. The weight of the yoke bar 515 normally holds the rear part of the yoke frame in depressed position where it is arrested by a pin 520 (Fig. 27) contacting with the flange of the right-hand standard 103; but when the key 505 is depressed the forward end of the lever 513 is depressed, thus lifting the yoke frame and bringing the flange 518 into the paths of the transfer lugs 215 of the several register wheels 125.

A second yoke bar 521 extends across the series of stop supports 154 beneath the feet 185 of the levers 180. As best shown in Figs. 4 and 29, the yoke bar 521 is supported at its ends on arms 522 which are pivoted on pins 523 projecting from the standards 193 and 194 which support the pivot rod 192. The yoke bar 521 is formed with a stiffening flange 524. The left-hand one of the arms 522 has an upstanding arm which at its upper end is bent back upon itself, as shown at 526, to embrace loosely the rear end of the lever 508. The yoke bar 520 normally stands in its depressed position indicated in Fig. 4, but when the zero key is depressed the rear end of the lever 508 is elevated which draws the yoke bar up to the position shown in Fig. 29, thus elevating all of the feet 185 and operating on the lever arms 184 and 180 to move the universal bars 175 to their forward positions, thus withdrawing all of the retaining stops 172 from operative position without operating any of the stops 161–169. This leaves all of the register wheels free to turn to an indefinite extent except as their motion is limited by the flange 518 of the yoke bar 515. If now the operating handle 220 be drawn forward all of the register wheels will be turned until one of the transfer lugs 215 of each wheel is arrested by the flange 518 and the parts are so arranged that this brings the zeros to the sight opening. The zero key 505 is then released and the handle is pushed back to its extreme rear position which operates the bar 246, which acting on the feet 183 restores all of the universal bars 175 to normal position and projects all of the retaining stops 172 to operative position. The machine is thus cleared for a new computation.

What I claim as new and desire to secure by Letters Patent, is:—

1. In a computing machine, the combination of a common driver, a series of individual drivers each independently frictionally connected with said common driver, and a series of register wheels each frictionally connected with one of said individual drivers.

2. In a computing machine the combination of a common driver, a series of individual drivers each independently frictionally connected with said common driver, a series of register wheels each frictionally connected with one of said individual drivers, and differential stop devices coöperating with said individual drivers.

3. In a computing machine, the combination of a common driver, a series of individual drivers each independently frictionally connected with said common driver, a series of register wheels each frictionally connected with one of said individual drivers, differential stop devices coöperating with said individual drivers, and means for preventing backward rotation of said register wheels.

4. In a computing machine, the combination of a common driver having a to and fro motion, a series of individual drivers each independently frictionally connected with said common driver, a series of register wheels each frictionally connected with one of said individual drivers, differential stop devices coöperating with said individual drivers to arrest their motion in a forward direction at different points in accordance with numbers to be added, means for arresting the backward motion of said individual drivers, and means for preventing backward rotation of said register wheels.

5. In a computing machine, the combination of a common driver, a series of individual drivers each independently frictionally connected with said common driver, a series of register wheels each frictionally connected with one of said individual drivers, differential stop devices for limiting the forward motion of said individual drivers at different points, means for limiting the backward motion of said drivers, and means for positively moving said drivers in a backward direction.

6. In a computing machine, the combination of a driving shaft, a series of driving disks mounted on said shaft and each independently frictionally connected therewith, and a series of register wheels mounted on said disks and frictionally connected therewith.

7. In a computing machine, the combination of a driving rock shaft, a series of driving disks mounted on said shaft and each independently frictionally connected therewith, a series of register wheels mounted on said disks, means whereby said disks turn said register wheels in one direction, and means for preventing rotation of said register wheels in the other direction.

8. In a computing machine, the combination of a common driver, a series of individual drivers each independently frictionally connected with said common driver, a series of register wheels one driven by each of said individual drivers, differential stop devices for arresting said individual drivers in different positions, and means for positively restoring said individual drivers to normal position.

9. In a computing machine, the combination of a common to and fro moving driver, a series of individual drivers each independently frictionally connected with said common driver, a series of register wheels one driven by each of said individual drivers, differential stop devices for arresting said individual drivers in different positions, and a positive connection between said common driver and each of said individual drivers for insuring the restoration to normal position of each of said individual drivers.

10. In a computing machine, the combination of a to and fro moving common driver, a series of individual drivers, a yielding connection between said common driver and each of said individual drivers whereby said common driver tends to move each of said individual drivers with it on its forward stroke, differential stop devices for arresting said individual drivers on their forward strokes, a positive connection between said common driver and each of said individual drivers for restoring said individual drivers to normal position, and register wheels driven by said individual drivers.

11. In a computing machine, the combination of a series of individual rotary drivers, a series of register wheels each mounted on and frictionally connected with one of said drivers, and means for rotating said drivers differential distances in accordance with numbers.

12. In a computing machine, the combination of a common driver, a series of individual drivers each independently yieldingly connected with said common driver, and a series of register wheels each yieldingly connected with one of said individual drivers.

13. In a computing machine, the combination of a common driver, a series of individual drivers each independently yieldingly connected with said common driver, and a series of register wheels each frictionally connected with one of said individual drivers.

14. In a computing machine, the combination of a common driver, a series of individual drivers each independently yieldingly connected with said common driver, a series of register wheels each frictionally connected with one of said individual drivers, and differential stop devices coöperating with said individual drivers.

15. In a computing machine, the combination of a to and fro moving common driver, a series of individual drivers, each independently yieldingly connected with said common driver, a series of register wheels each yieldingly connected with one of said individual drivers, differential stop devices coöperating with said individual drivers, and means for preventing backward rotation of said register wheels.

16. In a computing machine, the combination of a driving shaft, a series of driving disks mounted on said shaft and each independently yieldingly connected therewith, and a series of register wheels each yieldingly connected with one of said disks.

17. In a computing machine, the combination of a driving rock shaft, a series of driving disks mounted on said shaft and each independently yieldingly connected therewith, differential stop devices for arresting the motion of said driving disks in one direction in accordance with numbers, a series of register wheels concentric with said shaft, means whereby said disks turn said register wheels in one direction and means for preventing rotation of said register wheels in the other direction.

18. In a computing machine, the combination of a series of individual drivers, means for moving said drivers differential distances in accordance with numbers, and a series of register wheels each frictionally connected with one of said drivers.

19. In a computing machine, the combination of a series of individual drivers, means for moving said drivers differential distances in accordance with numbers and for restoring said drivers, a series of register wheels, each frictionally connected with one of said drivers, and means for allowing said register wheels to move with said drivers in one direction and for preventing motion of said register wheels in the other direction.

20. In a computing machine, the combination of a series of individual drivers, means for moving said drivers differential distances in accordance with numbers and for restoring said drivers, a series of register wheels, each frictionally connected with one of said drivers, means for preventing motion of said register wheels in one direction but allowing said wheels to move in another direction, and transfer mechanism including means for allowing to any of said drivers on occasion an additional increment of motion.

21. In a computing machine, the combination of a series of individual rotary drivers, a series of register wheels, each mounted on and frictionally connected with one of said drivers, means for rotating said drivers differential distances in accordance with numbers, and means for preventing rotation of said register wheels in one direction but allowing said wheels to turn with the drivers in the other direction.

22. In a computing machine, a registering unit comprising a collar 110 having an annular flange 113, two annular disks 114 and 115 mounted on said collar on opposite sides of said flange, means for pressing said disks into frictional contact with said flange, an annular register wheel 125 mounted on said disks, and means for frictionally connecting said wheel with said disks.

23. In a computing machine, the combination with a rotary denominational element and a driver, of means for frictionally connecting said denominational element with said driver comprising an annular flange on the driver, two annular parts, one on each side of said flange, and spring means for drawing said annular parts toward each other into frictional contact with said flange.

24. In a computing machine, the combination with a series of co-axial rotary denominational elements and a common driver for said elements, of means for frictionally connecting said elements with said driver comprising a series of annular flanges on said driver, a pair of annular parts for each denominational element on opposite sides of one of said flanges, and adjustable spring means for drawing each pair of annular parts together into frictional contact with their annular flange, said annular parts having registering holes therein for giving access to said spring means.

25. In a computing machine, the combination of a shaft, a series of rotary denominational elements mounted on said shaft, and adjustable frictional devices connecting said elements with said shaft, said elements having registering holes therein for giving access to said frictional connections for the purpose of adjustment.

26. In a computing machine, the combination of a series of register wheels, rotary drivers for said register wheels, a hollow shaft on which said drivers are mounted and with which they are operatively connected, setting-up mechanism for setting up numbers to be registered, and operating mechanism including a shaft inside said hollow shaft and having lost motion connection therewith, and means operated during the lost motion between said shafts for resetting said setting-up devices.

27. In a computing machine, the combination of a frame, a series of toothed registering elements mounted on said frame, a series of retaining pawls for said registering elements, a frame piece on which said pawls are mounted, and a wedge-shaped part between said frame piece and said frame for adjusting said frame piece and with it all of said pawls.

28. In a computing machine, the combination of a differentially movable registering element having two stops thereon out of line with each other, numeral keys and a series of digit stops controlled by said keys and arranged in staggered relation, some of said key controlled stops being movable into the path of one of the stops on the registering element and the other of said key controlled stops being movable into the path of the other of said stops on the registering element.

29. In a computing machine, the combination of a differentially movable element, numeral keys, a support having a series of grooves in one face thereof, a series of key controlled stops for said element lying in said grooves, and a cover plate for said grooves.

30. In a computing machine, the combination of a differentially movable element, numeral keys, a support having grooves in one face thereof, key controlled stops for said element of wires sprung into said grooves to place them under spring tension whereby said wires are placed under frictional restraint, and a cover plate for said grooves.

31. In a computing machine, the combination of a stop support having a series of holes therein, a series of stop strips or wires lying in said holes, said strips or wires being sprung to place them under frictional restraint, and means for operating said stops.

32. In a computing machine, the combination of a differentially movable element, numeral keys, a support comprising two plates lying face to face and having grooves in their contiguous faces, and key controlled stops for said element lying in said grooves.

33. In a computing machine, the combination of a differentially movable element, numeral keys, a support comprising two plates lying face to face and having grooves in their contiguous faces, and key controlled stops for each element lying in said grooves, said stops consisting of wires sprung into said grooves to place them under spring tension.

34. In a computing machine, the combination of numeral keys, digit stops controlled by said keys, a support for said stops comprising two plates having in their contiguous faces grooves in which said stops lie, the grooves in one plate alternating with the grooves in the other plate whereby said stops are arranged in staggered relation, and a differentially movable element controlled by said stops.

35. In a computing machine, the combination of a differentially movable element, numeral keys, a support comprising two plates lying face to face and having grooves in their contiguous faces, key controlled stops for said element lying in said grooves, a retaining stop mounted in said support, and means for operating said retaining stop.

36. In a computing machine, the combination of a differentially movable element, numeral keys, a support comprising two plates lying face to face and having grooves in their contiguous faces, key controlled stops for said element lying in said grooves, a universal bar operated by any of said key controlled stops, and a retaining stop controlled by said universal bar.

37. In a computing machine, the combination of a series of registering elements, a single group of numeral keys common to all of said registering elements, a series of sets of key controlled stops, one set for each of said registering elements, means for bringing any one of said sets of stops under the control of the keys, and a series of universal bars, one arranged to be operated by each of said sets of stops.

38. In a computing machine, the combination of a series of registering elements, a single group of keys common to all of said registering elements, a series of sets of digit stops, one set for each of said registering elements, means for bringing said sets of stops one after another under the control of said keys, a retaining stop for each of said registering elements, a universal bar for each of said sets of key controlled stops, and connections between said universal bars and said retaining stops.

39. In a computing machine, the combination of a series of registering elements, a single group of keys common to all of said registering elements, a series of sets of digit stops, one set for each of said registering elements, means for bringing said sets of stops one after another under the control of said keys, a retaining stop for each of said registering elements, a universal bar for each of said sets of key controlled stops, connections between said universal bars and said retaining stops, and means for restoring all of said universal bars to normal position, said universal bars when restored restoring the operated digit stops to normal position.

40. In a computing machine, the combination of a series of registering elements, a single group of numeral keys common to all of said registering elements, a series of plate-like stop carriers, one corresponding to each of said registering elements, a set of key-operated stops carried by each of said carriers, a universal bar carried by each of said carriers and arranged to be operated by any stop of the corresponding set, a series of retaining stops for said registering elements, one on each of said stop carriers, said retaining stops being operated by said universal bars.

41. In a computing machine, the combination of a series of registering elements, a single group of numeral keys common to all of said registering elements, a series of plate-like stop carriers, one corresponding to each of said registering elements, a set of key operated stops carried by each of said carriers, a universal bar carried by each of said carriers and arranged to be operated by any stop of the corresponding set, a series of retaining stops for said registering elements, one on each of said stop carriers, said retaining stops being operated by said universal bars, and operating mechanism comprising means for operating said registering elements and means for restoring said universal bars and stops to normal position.

42. In a computing machine, the combination of a series of registering elements, a series of movably mounted stop carriers, one for each registering element, keys, a set of key-controlled stops and a retaining stop carried by each of said stop carriers, and transfer mechanism including means for moving said stop carriers.

43. In a computing machine, the combination of a series of registering elements, a series of movably mounted stop carriers, numeral keys, a set of key operated stops and a retaining stop carried by each of said stop carriers, a universal bar for the key operated stops carried by each of said stop carriers and controlling said retaining stop, transfer mechanism including means for moving said stop carriers, and operating mechanism including means for operating said registering elements, for restoring said universal bars and for restoring any stop carrier or carriers that may have been moved to transfer.

44. In a computing machine, the combination of a series of registering elements each independently frictionally driven, a series of stop carriers, one for each of said registering elements, numeral keys, a set of key controlled stops and a retaining stop carried by each of said stop carriers, transfer devices including means for moving said stop carriers, and operating mechanism including frictional means for driving said registering elements, means for restoring the operated stops, and means for restoring any of said stop carriers that may have been moved to transfer.

45. In a computing machine, the combination of a differentially movable denominational member, numeral keys, a stop support, a series of key operated digit stops carried by said support, a retaining stop carried by said support, a universal bar operated by any of said digit stops, means operated by said universal bar for moving said retaining stop to inoperative position, means for restoring said universal bar and digit stops, a spring for restoring said retaining stop, and means for operating said denominational member.

46. In a computing machine, the combination of register wheels, means for operating said register wheels, differential stop devices for arresting the motion of said register wheels by said operating means, and transfer devices comprising means for moving said stop devices to allow to the register wheels an increment of motion.

47. In a computing machine, the combination of register wheels, drivers for said register wheels, differential stop devices for arresting said drivers to control the motion of the register wheels, and transfer devices comprising means operated by wheels of lower denomination for causing the stop devices for a wheel of higher denomination to be moved to allow to said wheel of the higher denomination an increment of motion.

48. In a computing machine, the combination of a series of register wheels, means for actuating said register wheels, a series of settable stops for each register wheel, and transfer devices comprising means controlled by one wheel for causing the set of stops for another wheel to be moved to allow said other wheel an increment of motion.

49. In a computing machine, the combination of a series of denominational members, means for actuating said members, differential stop devices for limiting the movement of said members by said actuating means in accordance with numbers, and transfer devices comprising means controlled by one of said denominational members for moving the stop devices of the next succeeding denominational member to allow to the latter member an increment of motion.

50. In a computing machine, the combination of a series of denominational members, means for actuating said denominational members, a series of settable stops for each of said denominational members, and transfer devices comprising means controlled by one denominational member for causing the entire series of stops for the next denominational member to be moved to allow to said next denominational member an increment of motion.

51. In a computing machine, the combination of a series of denominational members, means for actuating said denominational members, a series of frames, one for each of said denominational members, a series of settable stops carried by each of said frames, and transfer devices comprising means controlled by one denominational member for causing the frame of the next denominational member to be moved to allow to said next denominational member an increment of motion.

52. In a computing machine, the combination of a series of denominational members, means for actuating said denominational members, a series of pivoted frames one for each denominational member, a series of sliding stops carried by each of said frames, and transfer devices comprising means controlled by one denominational member for causing the stop frame of the next denomination to be rocked a limited distance about its pivot to allow to the next denominational member an increment of motion.

53. In a computing machine, the combination of a series of denominational members each independently frictionally driven, a series of settable stops for each of said denominational members, and transfer devices including means controlled by one denominational member for causing the series of stops of the next denominational member to move as an entirety to allow to said next denominational member an increment of motion.

54. In a computing machine, the combination of register wheels, differential stop devices for arresting the motion of said register wheels, transfer devices comprising means for moving said stop devices to allow to the register wheels an increment of motion, means for operating said register wheels, and means for restoring said stop devices.

55. In a computing machine, the combination of a series of register wheels, setting-up mechanism including a series of sets of stops, one set for each register wheel, means for setting said stops in accordance with numbers, transfer devices comprising means controlled by one wheel for causing the set of stops for another wheel to be moved to allow to said other wheel an increment of motion, and operating mechanism including means for operating said register wheels and means for restoring said stops.

56. In a computing machine, the combination of a series of register wheels, a series of drivers for said register wheels, means for moving said drivers from normal position differential distances in accordance with numbers, means for moving said register wheels with their respective drivers when said drivers are moved differentially from normal position, transfer devices for allowing to any of said drivers and its register wheel on occasion an increment of motion from normal position in addition to the differential motion referred to and in the same direction, the combination including means for restoring the drivers to normal position independently of the register wheels.

57. In a computing machine, the combination of a series of to and fro moving drivers, one for each denomination, said drivers having a fixed normal position, means for moving said drivers digit value distances from normal position and for restoring said drivers to normal position, transfer devices for affording to any of said drivers on occasion an increment of motion from normal position in addition to the digit value motion of said driver and in the same direction, and register wheels operated by said drivers.

58. In a computing machine, the combination of a series of drivers, one for each denomination, said drivers having fixed normal positions, means for imparting to said drivers forward strokes through digit value distances and return strokes to normal position, transfer devices for affording to any driver on occasion an increment of motion on its forward stroke, and register wheels operated by said drivers.

59. In a computing machine, the combination of a series of registering elements, a series of movably mounted stop carriers, one for each of said registering elements, digit stops and retaining stops carried by said stop carriers, means for holding said stop carriers in normal position, trips for said holding means, and means carried by said registering elements for operating said trips to transfer.

60. In a computing machine, the combination of a series of registering elements, a series of movably mounted stop carriers, one for each of said registering elements, digit stops and retaining stops carried by said stop carriers, a lever pivoted on each of said stop carriers for holding said carriers in normal position, a trip for each of said levers, and means on said registering elements for operating said trips to transfer.

61. In a computing machine, the combination of a series of registering elements, a series of plate-like pivoted stop carriers, one for each of said registering elements, digit stops and retaining stops carried by said stop carriers, a lever pivoted to each of said stop carriers and having a part engaging the stationary framework to retain said stop carriers in normal position, a trip lever pivoted to each of said stop carriers and normally retaining said holding lever in holding position, and means on said registering elements for operating said trip levers to transfer.

62. In a computing machine, the combination of a series of registering elements, a series of movably mounted stop carriers, one for each of said registering elements, digit stops and a retaining stop carried by each of said stop carriers, a universal bar carried by each of said stop carriers and arranged to be operated by said digit stops and to operate said retaining stop, a lever connected with said universal bar, transfer devices for affording motion to any of said stop carriers to transfer, and operating mechanism including means for operating said registering elements and also including a bar lying across said series of levers, said bar when operated restoring said levers, universal bars and stops to normal position and also restoring to normal position any of said stop carriers that may have been moved to transfer.

63. In a computing machine, the combination of a series of registering elements; a series of stop carriers, one for each of said registering elements; settable stops carried by each of said stop carriers; and operating mechanism including means for operating said registering elements, means for restoring said settable stops, and a resilient connection with said restoring means to prevent straining of the parts.

64. In a computing machine, the combination of a series of registering elements; a series of movably mounted stop carriers; settable stops carried by said stop carriers; transfer mechanism for affording a movement to any of said stop carriers to transfer; and operating mechanism including means for operating said registering elements, means for restoring any of said stop carriers that may have been moved to transfer, and resilient connections to said restoring means to prevent straining of the parts.

65. In a computing machine, the combination with registering devices and means for setting up numbers to be registered on said registering devices, of operating mechanism including a handle having a forward stroke and a return stroke; and means for automatically moving said handle through part of its forward stroke after the completion of its return stroke.

66. In a computing machine, the combination of registering devices; setting up devices including digit stops; an operating handle having a forward and a return stroke; means operated on the forward stroke of said handle for operating said registering devices; means operated on the return stroke of said handle for re-setting said digit stops; and means for automatically moving said handle through a part of its forward stroke in order to restore to normal position said stop re-setting means.

67. In a computing machine, the combination of registering devices; setting-up devices including digit stops; a single set of numeral keys common to all of said registering devices; denomination selecting mechanism for bringing the digit stops of one denomination after another under the control of said keys; and operating mechanism including a handle having a to and fro stroke; means operated on the forward stroke of said handle for operating said registering mechanism; means operated on the return stroke of said handle for re-setting said digit stops and said denomination selecting mechanism; and means for automatically imparting to said handle a part of its forward stroke in order to restore to normal position said re-setting and restoring means.

68. In a computing machine, the combination of registering devices; means for setting up numbers to be registered on said registering devices; an operating handle having a forward and a return stroke; means including a lost motion connection between said operating handle and said registering devices for operating said registering devices on the forward stroke of said operating handle; and means acting after the completion of the return stroke of said operating handle for automatically taking up said lost motion.

69. In a computing machine, the combination with registering devices and means for controlling the same, of operating mechanism including a handle having at each operation thereof three motions, two of which are imparted to the handle by hand; and means for imparting the third motion to said handle automatically.

70. In a computing machine, the combination of a series of registering elements, a single group of digit keys common to said registering elements, a series of bars operated by said keys, a carriage, a series of bell cranks carried by said carriage and each having an arm arranged to be operated by one of said bars, a series of sets of digit stops arranged to be operated by the other arms of said bell cranks, and means for stepping said carriage from one of said sets of stops to another.

71. In a computing machine, the combination of a series of registering elements, a single group of digit keys common to said registering elements, bars operated by said keys, a carriage movable along said bars, a set of nested levers carried by said carriage and each having an arm arranged to be operated by one of said bars, and means operated by said levers for controlling said registering elements.

72. In a computing machine, the combination of a series of registering elements, a single group of digit keys common to said registering elements, bars arranged to be depressed by said keys, a carriage movable along said bars, a set of nested bell cranks carried by said carriage and each having an arm arranged to be operated by one of said bars, and a series of sets of stops for said registering elements, the stops of each set arranged in vertical series and in position to be actuated by the other arms of said bell cranks.

73. In a computing machine, the combination of a series of registering elements, a group of keys common to said registering elements, a denomination selecting carriage, means for imparting a step-by-step movement to said carriage as the keys are operated, and a pawl and ratchet to prevent rebound of said carriage.

74. In a computing machine, the combina-

74. In a computing machine, the combination of a series of registering elements, a group of keys common to said registering elements, a denomination selecting carriage, means for imparting a step-by-step movement to said carriage as the keys are operated, a pawl and ratchet to prevent rebound of said carriage, and operating mechanism including means for throwing said pawl and ratchet out of engagement.

75. In a computing machine, the combination of a series of registering elements, a group of keys common to said registering elements, a denomination selecting carriage, means for imparting a step-by-step motion to said carriage as the keys are operated, means brought into action by the first key depression for preventing backward motion of said carriage, and operating mechanism including means for releasing said means for preventing backward motion.

76. In a combined typewriting and computing machine, the combination of the carriage and printing instrumentalities of the typewriter, registering mechanism for registering numbers written on said typewriter, setting-up mechanism for setting up the numbers to be registered, operating mechanism for operating the registering mechanism, means for holding the typewriter carriage against backward motion after a number has been set up, and means operated by said operating mechanism for releasing said holding means.

77. In a combined typewriting and computing machine, the combination of typewriting mechanism including a carriage and means for writing any words or numbers, computing mechanism for registering numbers written on said typewriting mechanism and including setting up mechanism and an operating handle, means brought into operation by the numeral keys for holding the typewriter carriage against backward movement, and means operated by said handle for releasing said holding means.

78. In a combined typewriting and computing machine, the combination of typewriting mechanism including a carriage and means for writing any words or numbers, computing mechanism for registering numbers written on said typewriting mechanism and including setting up mechanism and an operating handle, means brought into operation by the numeral keys for holding the typewriter carriage against backward movement, means operated by said handle for releasing said holding means, and hand operated means independent of said handle for releasing said holding means.

79. In a combined typewriting and computing machine, the combination of typewriting mechanism including a carriage and means for writing any words or numbers, computing mechanism for registering numbers written on the typewriter, said computing mechanism including setting up mechanism, an operating handle, a step-by-step moving denomination selector controlled by said typewriter carriage, a pawl and ratchet for preventing backward motion of said selector, means for bringing said pawl and ratchet into coöperation, and means operated by said handle for separating said pawl and ratchet.

80. In a combined typewriting and computing machine, the combination of typewriting mechanism including a carriage and means for writing any words or numbers, computing mechanism for registering numbers written on the typewriter, said computing mechanism including setting up mechanism, an operating handle, a step-by-step moving computer carriage, connections between said computer and typewriter carriages, a movably mounted rack bar and a pawl for preventing backward motion of said carriages, means operated by said handle for moving said rack bar out of engagement with said pawl, and means for moving said rack bar into engagement with said pawl.

81. In a combined typewriting and computing machine, the combination of typewriting mechanism including a carriage and means for writing any words or numbers, computing mechanism for registering numbers written on the typewriter, said computing mechanism including setting up mechanism, an operating handle, a step-by-step moving computer carriage, connections between said computer and typewriter carriages, a movably mounted rack bar and a pawl for preventing backward motion of said carriages, means operated by said handle for moving said rack bar out of engagement with said pawl, and means operated by the numeral keys for moving said rack bar into engagement with said pawl.

82. In a combined typewriting and computing machine, the combination of a computing machine having a main frame, a typewriting machine having a main frame detachably mounted on that of the computing machine, said typewriting machine having a carriage and said computing machine having denomination selecting mechanism controlled by said carriage, and connections between said carriage and said denomination selecting mechanism including a vertical shaft in the computing machine, a vertical shaft on the typewriting machine, and a detachable coupling between said shafts.

83. In a combined typewriting and computing machine, the combination of computing mechanism comprising a carriage, typewriting mechanism arranged above said computing mechanism and comprising a carriage, and connections between said carriages including a vertical rock shaft, an arm on the lower part of said rock shaft connected with the computer carriage, and means on the upper part of said rock shaft whereby said rock shaft is controlled by the typewriter carriage.

84. In a combined typewriting and computing machine, the combination of computing mechanism comprising a carriage, typewriting mechanism arranged above said computing mechanism and comprising a carriage, and connections between said carriages including a vertical rock shaft, an arm on the lower part of said rock shaft connected with the computer carriage, an arm on the upper part of said rock shaft, and a cam on the typewriter carriage for controlling said upper arm.

85. In a combined typewriter and computing machine, the combination of computing mechanism comprising a carriage and rails for guiding said carriage in a straight path across the machine; typewriting mechanism mounted above said computing mechanism and comprising a carriage; and connections between said carriages comprising a vertical rock shaft; a horizontally disposed arm on the lower part of said rock shaft, a link connecting said arm with the computer carriage, and means at the upper part of said rock shaft whereby the latter is controlled by the typewriter carriage.

86. In a combined typewriting and computing machine, the combination of a typewriter carriage, a rock shaft controlled by said typewriter carriage, a computer carriage controlled by said rock shaft, operating mechanism for the computer, and means operated by said operating mechanism for restoring said computer carriage to initial position independently of said typewriter carriage.

87. In a combined typewriting and computing machine, the combination of a typewriter carriage, a rock shaft controlled by said typewriter carriage, a computer carriage, an arm on said rock shaft connected with said computer carriage, operating mechanism for the computer, and a second arm on said rock shaft connected with said operating mechanism to restore said rock shaft and computer carriage to initial position.

88. In a combined typewriting and computing machine, the combination of a computer carriage, a spring for moving said carriage from one denominational position to another, a detent for holding said carriage in initial position against the tension of said spring, typewriting mechanism including a typewriter carriage, and means controlled by said typewriter carriage for tripping said detent.

89. In a combined typewriting and computing machine, the combination of a computer carriage, a spring for moving said carriage from one denominational position to another, a detent for holding said carriage in initial position against the tension of said spring, typewriting mechanism including a typewriter carriage, means controlled by said typewriter carriage for tripping said detent, and means controlled by said typewriter carriage for controlling the motion of said computer carriage under the impulse of said spring.

90. In a combined typewriting and computing machine, the combination of a computer carriage, a spring for moving said carriage from one denominational position to another, a detent for holding said carriage in initial position against the tension of said spring, typewriting mechanism including a typewriter carriage, means controlled by said typewriter carriage when said carriage is in a computing column for controlling the motion of said computer carriage under the impulse of its spring, and means controlled by said typewriter carriage and operative at any letter space position in said computing column for tripping said detent.

91. In a combined typewriting and computing machine, the combination of a computer carriage, a spring for moving said carriage from one denominational position to another, a detent for holding said carriage in initial position against the tension of said spring, typewriting mechanism including a typewriter carriage, and means including a pawl and ratchet operated by said typewriter carriage for tripping said detent.

92. In a combined typewriting and computing machine, the combination of a computer carriage, a spring for moving said carriage from one denominational position to another, a detent for holding said carriage in its initial position, a ratchet mounted on parallel links and connected with said detent, a typewriter carriage, and a pawl controlled by said typewriter carriage and operating on said ratchet to trip said detent.

93. In a combined typewriting and computing machine, the combination of a computer carriage, a spring for moving said carriage from one denominational position to another, a detent for holding said carriage in its initial position, a typewriter carriage, a cam adjustably connected with said typewriter carriage for controlling said computer carriage, and means associated with said cam for tripping said detent.

94. In a combined typewriting and computing machine, the combination of typewriting mechanism including a carriage and printing instrumentalities, computing mechanism, and a denomination selecting device for said computing mechanism, comprising a cam and a follower, one of said parts being connected with the carriage of the typewriter and the other of said parts being connected with the computing machine, said follower being mounted for motion in a direction transverse to that of the typewriter carriage and being controlled in such motion by said cam.

95. In a combined typewriting and computing machine, the combination of typewriting mechanism including printing instrumentalities and a carriage, computing mechanism, connections between said typewriter carriage and said computing mechanism including as parts thereof a cam and a follower, one of said parts being connected with the typewriter carriage and the other of said parts being connected with the computing mechanism and mounted for motion in a direction transverse to that of the motion of the part connected with the carriage, such motion being controlled by the coöperation of said cam and said follower.

96. In a combined typewriting and computing machine, the combination of typewriting mechanism including printing instrumentalities and a carriage, computing mechanism, connections between said typewriter carriage and the computing mechanism including a pivoted member connected with the computing mechanism, an arm on said pivoted member normally extending therefrom approximately parallel with the direction of motion of the carriage, and a cam and follower for controlling said arm, one of said parts being mounted on the carriage and the other mounted on the arm.

97. In a combined typewriting and computing machine, the combination of typewriting mechanism including printing instrumentalities and a carriage, computing mechanism and connections between said computing mechanism and said carriage including a spring propelled step-by-step moving device, a latch normally holding said step-by-step moving device in inoperative position against the tension of said spring, means controlled by said carriage for tripping said latch when the carriage reaches the adding column, and a device moving with the carriage and arranged to control the step-by-step motion of said denomination selecting device.

98. In a combined typewriting and computing machine, the combination of typewriting mechanism including printing instrumentalities and a carriage, of computing mechanism, a step-by-step denomination selecting device for said computing mechanism, means whereby said carriage controls the step-by-step motion of said selecting device, means for restoring said selecting device to normal position independently of the motion of the carriage, and means for automatically bringing said denomination selecting device into a position corresponding with that of the carriage when said carriage is brought to any letter space position in the adding column.

99. In a combined typewriting and computing machine, the combination of typewriting mechanism including printing instrumentalities and a carriage, computing mechanism and connections between said computing mechanism and said carriage including a cam and a follower, said cam having inclined portions for causing said connections to move from one denominational position to another, and a dwell or dwells corresponding to punctuation points.

100. In a combined typewriting and computing machine, the combination of typewriting mechanism including printing instrumentalities and a carriage, computing mechanism, and connections between said computing mechanism and said carriage including a cam mounted on and traveling with the carriage and a follower connected with the computing mechanism and coöperating with said cam, said cam having inclined portions for causing said connections to move from one denominational position to another, and a dwell or dwells corresponding to punctuation points.

101. In a combined typewriting and computing machine, the combination of typewriting mechanism including printing instrumentalities and a carriage, a cam adjustably connected with said carriage to vary the position of the adding column, computing mechanism, and a follower connected with said computing mechanism and coöperating with said cam, said cam having inclined portions for causing the follower to move step-by-step, and a dwell or dwells corresponding to punctuation points.

102. In a combined typewriting and computing machine, the combination of typewriting mechanism including printing instrumentalities and a carriage, computing mechanism and connections between said computing mechanism and said carriage including a cam and a follower, said cam having inclined portions for causing said connections to move from one denominational position to another, and a dwell or dwells corresponding to punctuation points, and said connections being adjustable to vary the position of the adding column in the line of writing.

103. In a combined typewriting and computing machine, the combination of typewriter printing instrumentalities, a typewriter carriage, tabulator mechanism for said typewriter carriage including a column stop bar and column stops adjustable lengthwise of said stop bar, computing mechanism and connections between said computing mechanism and said carriage including as parts thereof a cam and a follower, one of said parts being adjustably mounted on said column stop bar and said cam having a dwell or dwells corresponding to punctuation points.

104. In a combined typewriting and computing machine, the combination of typewriter printing instrumentalities, a typewriter carriage, tabulator mechanism for said typewriter carriage including a column stop bar and column stops adjustable lengthwise of said stop bar, computing mechanism, and connections between said computing mechanism and said carriage including as parts thereof a cam and a follower, one of said parts being adjustably mounted on said column stop bar and said cam having a dwell or dwells corresponding to punctuation points, said cam being readily detachable so that it may be replaced with another cam adapted for a different style of punctuation.

105. In a combined typewriting and computing machine, the combination of typewriter printing instrumentalities, a typewriter carriage, computing mechanism, a step-by-step moving denomination selecting device for said computing mechanism, connections between said device and the typewriter carriage comprising a rock shaft having an arm connected with said step-by-step device and a second arm adapted to swing in a direction transverse of the direction of motion of the typewriter carriage, and connections between said second arm and carriage comprising as parts thereof a cam and a follower, one of said parts moving with the carriage and the other mounted on said second arm.

106. In a combined typewriting and computing machine, the combination of typewriter printing instrumentalities, a typewriter carriage, computing mechanism, a step-by-step moving denomination selecting device for said computing mechanism, connections between said device and the typewriter carriage comprising a rock shaft having an arm connected with said step-by-step device and a second arm adapted to swing in a direction transverse to the direction of motion of the typewriter carriage, and connections between said second arm and carriage comprising as parts thereof a cam and a follower, one of said parts moving with the carriage and the other mounted on said second arm, a spring tending to move said rock shaft in one direction, a latch for retaining said rock shaft in normal position, and means for automatically tripping said latch when the carriage reaches the adding column.

107. In a combined typewriting and computing machine, the combination of typewriter printing instrumentalities, a typewriter carriage, computing mechanism, a step-by-step moving denomination selecting device for the computing mechanism controlled by the typewriter carriage, numeral keys, means controlled by said numeral keys for setting up in the denominations determined by the typewriter carriage the digits of a number, computing machine operating mechanism for operating the computing machine in accordance with the number set up, and means operated by said operating mechanism for resetting said step-by-step denomination selecting devices to normal position independently of the typewriter carriage.

108. In a computing machine, the combination with registering devices, of a denomination indicator for indicating the respective denominational values of said registering devices comprising a scale plate having a series of denominational designations marked thereon, means for affording a lengthwise motion of said scale plate, and covers for the ends of the scale plate arranged so that when the scale plate is in one position certain designations at one end of the series will be concealed and when the scale plate is in another position certain designations at the other end of the scale plate will be concealed.

109. In a computing machine, the combination of a series of register wheels, a cover for said register wheels having a sight opening and a denomination indicator adjacent said sight opening and comprising a scale plate having denominational designations thereon, covers for the ends of said scale plate, and means for affording an endwise motion of said scale plate, the arrangement being such that in one position of the scale plate certain designations are concealed and in another position of the scale plate certain other designations are concealed.

110. In a computing machine, the combination of a series of register wheels, a cover for said register wheels having a sight opening and a denomination indicator adjacent said sight opening and comprising a scale plate having denominational designations thereon, covers for the ends of said scale plate, and means for affording an endwise motion of said scale plate, the arrangement being such that in one position of the scale plate certain designations are concealed and in another position of the scale plate certain other designations are concealed, denomination selecting mechanism, and a pointer associated with said selecting mechanism and coöperating with said scale plate.

111. In a computing machine, the combination with registering devices, of a denomination indicator for indicating the respective denominational values of said registering devices comprising a scale plate having denominational designations thereon, means for covering a part or parts of said scale plate, and means for affording a motion of said scale plate, the arrangement being such that in one position of said scale plate certain of the designations on said scale plate are concealed and in another position certain other designations are concealed.

112. In a computing machine, the combination of registering devices, mechanism for setting up numbers to be registered on said registering devices, an operating handle that is capable of moving in either direction from normal position, means operated by said handle when moved in one direction for operating said registering devices in accordance with numbers set up on said setting up mechanism, and means operated by said handle when moved in the other direction from normal position for restoring said setting up mechanism to make corrections.

113. In a computing machine, the combination of registering devices, mechanism for setting up numbers to be registered on said registering devices, operating mechanism including means for operating said registering devices in accordance with numbers set up on said setting up mechanism, and means operated by a partial operation of said operating mechanism for restoring said setting up mechanism to make corrections.

114. In a computing machine, the combination of registering devices, mechanism for setting up numbers to be registered on said registering devices, an operating handle having a forward and a return stroke, means for automatically imparting to said operating handle a part of its forward stroke after the completion of its return stroke, means operated during the latter part of the forward stroke of said handle for operating said registering devices in accordance with numbers set up on said setting up mechanism, and means operated on the return stroke for restoring said setting up devices, the last recited means being operable by said handle separately from said register operating means, in order to make corrections.

115. In a computing machine, the combination of registering devices, mechanism for setting up numbers to be registered on said registering devices, an operating handle, means operated by said handle for operating said registering devices in accordance with numbers set up on said setting up mechanism, and means operated by said handle for clearing said setting up mechanism, the last recited means being operable by said handle separately from said register operating means, in order to make corrections.

116. In a computing machine, the combination of a register wheel, a set of digit keys, and means whereby the operation of any of said keys can cause said register wheel to turn a distance appropriate to the digital value of the operated key for addition or can cause said wheel to turn in the same direction a distance appropriate to the complement of the digital value of the operated key for subtraction.

117. In a computing machine, the combination of a registering element, a group of digit keys for controlling said registering element, and means whereby any of said keys when operated causes said registering element to be operated to an extent appropriate to the digital value of the operating key for the purpose of addition, said means being changeable so that said keys can impart to said registering element a different extent of motion in the same direction for the purpose of subtraction.

118. In a computing machine, the combination of a registering wheel, a group of digit keys for said register wheel, connections whereby the operation of any of said digit keys causes said register wheel to be turned a distance appropriate to the digital value of the operated key, and means for changing said connections so that the operation of any of said keys causes said register wheel to be turned a distance appropriate to the complement of the digital value of the operated key.

119. In a computing machine, the combination of a register wheel, a group of digit keys, a set of digit stops for controlling said register wheel, and means for connecting said keys with said stops in one order for addition and in another order for subtraction.

120. In a computing machine, the combination of numeral keys, bars operated by said keys, register wheels controlled by said bars, and means for effecting a relative shifting of said keys and bars to connect the respective keys with different ones of said bars.

121. In a computing machine, the combination of a set of numeral keys, a register wheel, a set of devices one for each digit and each adapted when operated to cause said wheel to be turned a distance appropriate to the digital value of the operated one of said devices, and means for bringing said devices under the control respectively of the numeral keys of like digital value or for bringing said devices under the control respectively of the keys of digital values equal to the complements of the respective digital values of said devices.

122. In a computing machine, the combination of a register wheel, means for controlling said wheel including a set of frames, one for each digit, a set of numeral keys, contact lugs on the several frames adapted to be operated by said keys, means for shifting said set of frames to bring contact lugs of the several frames respectively into position to be operated by the keys of corresponding digital values, and for shifting said frames to bring contact lugs of the several frames respectively into position for operation by keys of other digital values.

123. In a computing machine, the combination of a register wheel, means for controlling said register wheel including a set of bars one for each digit, contact lugs on said bars, a set of numeral keys arranged in a series lengthwise of said bars, a shifting frame on which said bars are mounted, means for shifting said frame to a position where contact lugs of said bars stand respectively in positions to be operated by the numeral keys of corresponding digital value or to a position where contact lugs of said bars stand respectively in positions to be operated by numeral keys of digital values different from those of the bars.

124. In a computing machine, the combination of numeral keys, bars operated by said keys, register wheels controlled by said bars, and means for effecting a relative shifting of said keys and bars to connect the respective keys with different ones of said bars, or to render said bars inoperable by said keys.

125. In a computing machine, the combination of a register wheel, means for controlling said wheel including a set of frames, one for each digit, a set of numeral keys, contact lugs on the several frames adapted to be operated by said keys, means for shifting said set of frames to bring contact lugs of the several frames respectively into position to be operated by the keys of corresponding digital values, and for shifting said frames to bring contact lugs of the several frames respectively into position for operation by keys of other digital values and for shifting said frames to move all of said frames out of coöperative relation to said keys.

126. In a computing machine, the combination of a register wheel, means for controlling said register wheel including a set of bars one for each digit, contact lugs on said bars, a set of numeral keys arranged in a series lengthwise of said bars, a shifting frame on which said bars are mounted, means for shifting said frame to a position where contact lugs of said bars stand respectively in positions to be operated by the numeral keys of corresponding digital value or to a position where contact lugs of said bars stand respectively in positions to be operated by numeral keys of digital values different from those of the bars, or to a position where all of said lugs are out of position to be operated by said keys.

127. In a computing machine, the combination of a series of register wheels, means for controlling said register wheels comprising a single set of keys common to all of said register wheels, means whereby any of said keys can cause any of said register wheels to be turned a distance appropriate to the digital value of the operated key and whereby any of said keys can cause any of said wheels to be turned in the same direction a distance appropriate to the complement of the digital value of the operated key.

128. In a computing machine, the combination of a series of registering elements, a single set of keys common to all of said registering elements, a set of key operated devices one for each digit, said set of key operated devices being common to all of said registering elements, means whereby said any of said devices can control any of said registering elements, and means for bringing said devices respectively into operative relation either with the keys of the same digital values as said devices or with the keys of digital values respectively the complements of those of the keys.

129. In a computing machine, the combination of a set of numeral keys, a set of bars for operation by said keys, a carriage having motion transmitting devices respectively operable by said bars, a series of denominational members, means for moving said carriage step-by-step along said bars and from one of said denominational members to another, and means for placing said bars under the control respectively of the keys of the same digital values or under the control respectively of the keys of complementary digital values.

130. In a computing machine, the combination of a set of numeral keys, a set of bars having contact lugs for operation by said numeral keys, a shifting frame in which said bars are mounted, means for shifting said frame to bring lugs of the several bars respectively into positions for actuation by the keys of the same digital values or to bring lugs of the several bars respectively into position to be actuated by the keys of complementary digital values, a series of denominational members, a carriage, a set of motion transmitting devices carried by said carriage along said bars, and means for stepping said carriage from one of said denominational members to another.

131. In a computing machine, the combination of a registering device, means including numeral keys and connections for controlling said registering device, an addition key and a subtraction key, and means whereby said addition and subtraction keys change the operative relation between said numeral keys and said registering device to cause the digit corresponding to the operated numeral key to be added or subtracted according as said addition key or said subtraction key is operated.

132. In a computing machine, the combination of numeral keys, registering mechanism, a subtraction key, an addition key, means controlled by said addition key to set the machine for addition, and means controlled by said subtraction key to set the machine for subtraction.

133. In a computing machine, the combination of numeral keys, registering mechanism, an addition key, a multiplication key, means controlled by said multiplication key to set the machine for multiplication, and means controlled by said addition key to set the machine for addition.

134. In a computing machine, the combination of numeral keys, setting-up mechanism controlled by said numeral keys, registering devices, operating mechanism including means for operating said registering devices in accordance with numbers set up on said setting-up devices and for clearing said setting-up devices, a multiplication key, means controlled by said multiplication key for throwing said clearing means out of operation, an addition key, and means controlled by said addition key for throwing said clearing means into operation.

135. In a computing machine, the combination of numeral keys, setting-up mechanism controlled by said numeral keys, registering devices, operating mechanism including means for operating said registering devices in accordance with numbers set up on said setting-up mechanism, an addition key, a subtraction key, a multiplication key, a division key, means for causing numbers to be added when said addition key or said multiplication key is operated or for causing said numbers to be subtracted when said subtraction key or said division key is operated, and a repeat device operated by said multiplication and division keys.

136. In a computing machine, the combination of a series of register wheels, means including numeral keys for controlling said wheels to add numbers, devices in the machine settable to cause to be added on the several wheels the complements of the digits corresponding to the operated keys for subtraction, and means for causing the wheel of lowest denomination to add one more than such complement at each and every subtracting operation.

137. In a computing machine, the combination of a series of register wheels, setting-up mechanism for setting up numbers to be added on said register wheels, numeral keys controlling said setting-up mechanism, means for changing said setting-up mechanism to cause any numeral key when operated to set up the complement of the digital value of said key for subtraction, means for operating the register wheels, and means for causing the wheel of lowest denomination to add one more than the complement of the digital value of the key operated in that denomination at each and every subtracting operation.

138. In a computing machine, the combination of a series of register wheels, numeral keys, digit stops set by said numeral keys, means for operating the register wheels in accordance with the set stops, means for causing the numeral keys to set stops corresponding to the complements of their respective digital values for subtraction, and means for causing one more than such complement to be added on the wheel of lowest denomination at each and every subtracting operation.

139. In a computing machine, the combination of a series of register wheels, numeral keys, digit stops set by said numeral keys, a movable carrier for the set of digit stops of lowest denomination, means for operating the wheels in accordance with the set stops, means for causing the numeral keys to set stops corresponding to the complements of their respective digital values for subtraction, and means for moving said stop carrier a unit's distance to cause one more than such complement to be added on the wheel of lowest denomination in subtracting operations.

140. In a computing machine, the combination of register wheels, numeral keys, means controlled by said numeral keys for controlling the register wheels to add numbers, a subtraction key, means controlled by said subtraction key to change the connections to cause the register wheels to add the complements of the digital values of the operated numeral keys, and means controlled by said subtraction key to cause the wheel of lowest denomination to add one more than such complement at each and every subtracting operation.

141. In a computing machine, the combination of a series of register wheels, a single set of numeral keys common to said register wheels, means for bringing said register wheels one after another under the control of said keys, means whereby said keys control said register wheels to add numbers the digits of which correspond to the digital values of the keys operated, means for causing said register wheels to add the complements of the respective digits for subtraction, and means for causing the wheel of lowest denomination to add one more than such complement at each and every subtracting operation.

142. In a computing machine, the combination of a series of register wheels, means including a series of sets of stops for controlling said wheels, a movably mounted carrier for the set of stops of lowest denomination, and means for setting the machine for addition or for subtraction, said setting means including means for maintaining said stop carrier in one position for addition and in another position for subtraction.

143. In a printing and computing machine, the combination of numeral keys, means controlled by said keys for printing numbers corresponding to the keys operated, computing mechanism including means for adding the numbers printed, and means for setting said computing mechanism to add the complements of the numbers printed, for subtraction.

144. In a computing machine, the combination of a series of register wheels, each having a lug, means for controlling said register wheels including retaining devices and digit stops, operating mechanism including means for turning said register wheels in accordance with the operated stops and for resetting said stops and retaining devices, a zero setting key, a bail operated by said zero setting key and interposed thereby into the paths of said lugs, and a second bail operated by said key for withdrawing all of said retaining devices from operative position.

145. In a computing machine, the combination of a series of register wheels, a series of individual drivers for said register wheels, a common driver to which each of said individual drivers is independently yieldingly connected, devices for normally retaining said individual drivers against operation, a series of sets of digit stops, keys for setting said stops and withdrawing the retaining devices, means for imparting to said common driver a forward and a return stroke, the register wheels moving with said driver on the forward stroke thereof, a zero setting key, a stop operated by said key for arresting the register wheels in zero position, means operated by said key for withdrawing all of said retaining devices, and means for restoring said retaining devices.

146. In a combined typewriting and computing machine, the combination of printing keys including numeral keys of the typewriting machine, key levers on which said keys are mounted, detachable connecting devices mounted on the numeral key levers and each comprising a plate 296 and two spring arms which embrace the key lever to secure said plate detachably in position, and computing mechanism operated by said detached plates.

147. In a computing machine, the combination of a series of registering devices, transfer devices for said registering devices, numeral keys, setting-up devices operated by said numeral keys, transfer devices, and a resetting bar for restoring to normal position any of said setting-up devices and any of said transfer devices that may have been operated.

148. In a computing machine, the combination of a series of register wheels, setting-up mechanism for setting up numbers to be registered on said register wheels, a hollow shaft on which said register wheels are mounted, a second shaft within said hollow shaft, a lost motion operative connection between said shafts, a spring for taking up said lost motion, an operating handle having a forward and a return stroke, said handle being connected with said second shaft, and means operated by said handle for clearing said setting up mechanism, said spring automatically imparting to said handle a part of its forward stroke sufficient to take up said lost motion.

149. In a computing machine, the combination with a series of register wheels, of means for controlling said wheels comprising a series of movably mounted stop carriers, settable stops carried by said carriers, transfer devices including levers mounted on said stop carriers and serving to hold said carriers in normal position and means for tripping said levers to allow said carriers to move to transfer, means for restoring said carriers, and means for positively insuring the restoration of said levers to normal position when the carriers are restored.

150. In a computing machine, the combination with a series of register wheels, of means for controlling said wheels comprising a series of movably mounted stop carriers, settable stops carried by said carriers, transfer devices including levers mounted on said stop carriers and serving to hold said carriers in normal position and means for tripping said levers to allow said carriers to move to transfer, means for restoring said carriers, and fixed abutments against which said levers are adapted to strike when said carriers are restored to normal position to insure the restoration of said levers to normal position.

151. In a computing machine, the combination of a series of registering elements, a series of individually settable digit stops for said registering elements, transfer devices comprising means for moving a set digit stop to allow to its registering element an increment of motion, and means for operating said registering elements.

Signed at the borough of Manhattan, city of New York, in the county of New York and State of New York this 27th day of October A. D. 1909.

ARTHUR W. SMITH.

Witnesses:
 CHARLES E. SMITH,
 E. M. WELLS.

Copies of this patent may be obtained for five cents each, by addressing the "Commissioner of Patents Washington, D. C."